(12) United States Patent
Yoshida et al.

(10) Patent No.: US 8,743,305 B2
(45) Date of Patent: Jun. 3, 2014

(54) LIQUID CRYSTAL DISPLAY DEVICE UTILIZING STORAGE CAPACITOR LINES

(75) Inventors: Masahiro Yoshida, Osaka (JP); Satoshi Horiuchi, Osaka (JP); Masakatsu Tominaga, Osaka (JP); Junichi Morinaga, Osaka (JP); Ryohki Itoh, Osaka (JP); Katsushige Asada, Osaka (JP); Hironobu Sawada, Osaka (JP); Hitoshi Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 242 days.

(21) Appl. No.: 12/812,723

(22) PCT Filed: Dec. 1, 2008

(86) PCT No.: PCT/JP2008/071796
§ 371 (c)(1),
(2), (4) Date: Jul. 13, 2010

(87) PCT Pub. No.: WO2009/110147
PCT Pub. Date: Sep. 11, 2009

(65) Prior Publication Data
US 2010/0296017 A1    Nov. 25, 2010

(30) Foreign Application Priority Data
Mar. 5, 2008 (JP) .................................. 2008-055336

(51) Int. Cl.
*G02F 1/1343* (2006.01)

(52) U.S. Cl.
USPC ............................ 349/39; 349/38; 349/146

(58) Field of Classification Search
USPC ................................................ 349/38–39
See application file for complete search history.

(56) References Cited

U.S. PATENT DOCUMENTS

| | | | |
|---|---|---|---|
| 5,870,157 A * | 2/1999 | Shimada et al. | 349/106 |
| 6,225,967 B1 | 5/2001 | Hebiguchi | |
| 6,249,326 B1 | 6/2001 | Hebiguchi | |
| 2006/0038932 A1* | 2/2006 | Murade | 349/42 |
| 2007/0057257 A1* | 3/2007 | Kim | 257/59 |
| 2007/0080348 A1 | 4/2007 | Wu et al. | |
| 2007/0182909 A1 | 8/2007 | Kim et al. | |
| 2008/0018815 A1 | 1/2008 | Choi et al. | |
| 2008/0024418 A1 | 1/2008 | Kim | |
| 2008/0024709 A1* | 1/2008 | Moon | 349/139 |
| 2009/0147165 A1* | 6/2009 | Kim et al. | 349/39 |

FOREIGN PATENT DOCUMENTS

| | | |
|---|---|---|
| EP | 1 882 977 A1 | 1/2008 |
| JP | 10-10546 A | 1/1998 |
| JP | 11-167127 A | 6/1999 |
| JP | 2002-55656 A | 2/2002 |
| JP | 2007-147802 A | 6/2007 |
| JP | 2008-26908 A | 2/2008 |

* cited by examiner

*Primary Examiner* — Lauren Nguyen
(74) *Attorney, Agent, or Firm* — Birch, Stewart, Kolasch & Birch, LLP

(57) ABSTRACT

A liquid crystal display device in which lengths (d1 and d2) of respective picture element electrodes (60) in an extended direction of scanning signal lines (32) are longer than lengths (d3) of the respective picture element electrodes (60) in an extended direction of video signal lines (35) is arranged such that storage capacitor lines (36) are provided along the respective scanning signal lines (32) so as to overlap the respective picture element electrodes (60) via an insulating film (70) in plan view.

17 Claims, 11 Drawing Sheets

F I G. 1 4
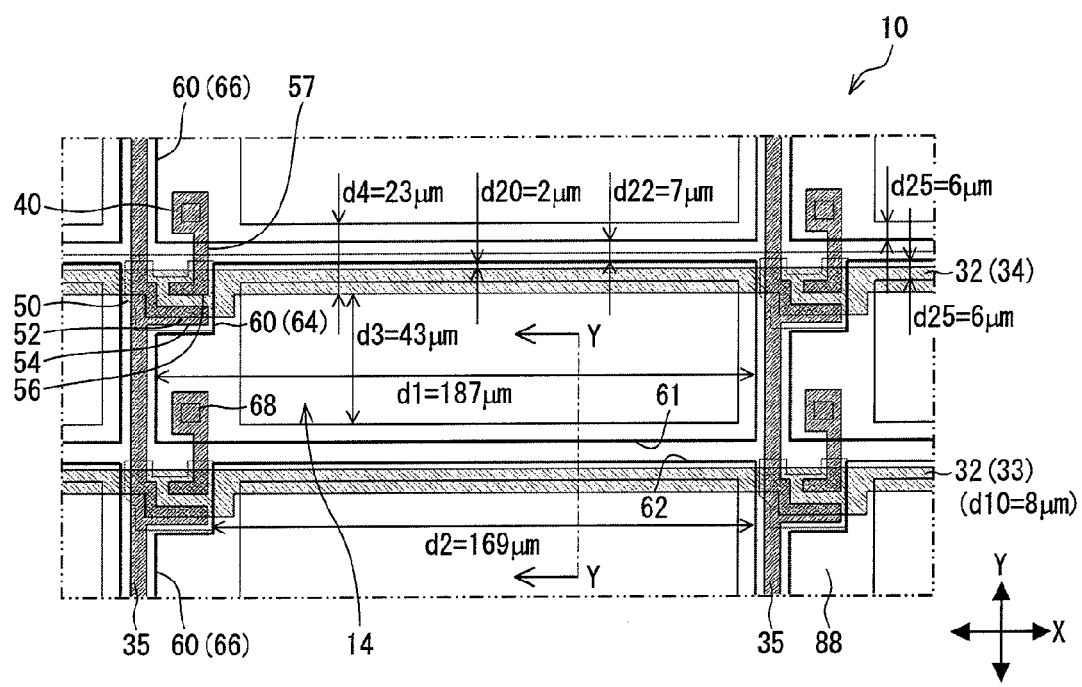

LIQUID CRYSTAL DISPLAY DEVICE UTILIZING STORAGE CAPACITOR LINES

TECHNICAL FIELD

The present invention relates to a liquid crystal display device, particularly to a liquid crystal display device including so-called transversely-lengthened picture element electrodes.

BACKGROUND ART

A liquid crystal display device, especially an active matrix liquid crystal display device, has been widely used as a display element. According to this active matrix liquid crystal display device, picture elements include respective switching elements. In order to control the respective switching elements, a plurality of scanning signal lines and a plurality of video signal lines are provided so as to intersect each other. The respective switching elements are provided at respective intersections of the plurality of scanning signal lines and the plurality of video signal lines. Note that a substantially rectangular region defined by a scanning signal line and a video signal line is regarded as a picture element and the picture element includes a picture element electrode.

(Vertically-Lengthened Picture Element Electrode)

Note here that the picture element electrode has been vertically lengthened in general. The following description is given with reference to (a) of FIG. 16. (a) of FIG. 16 is a drawing illustrating an arrangement of picture elements 14 in a liquid crystal display device 10 which realizes color display.

In order to realize color display, three kinds of the picture elements 14 are provided so as to display R (red), G (green), and B (blue), respectively (see (a) of FIG. 16).

A single pixel 16 is constituted by a set of the three kinds of the picture elements 14 for R, G, and B.

Note here that the pixel 16 is substantially square in general at least for the purpose of displaying a more natural video picture to a viewer of the liquid crystal display device 10. The liquid crystal display device 10 often has a rectangular shape which is transversely lengthened. In view of this, each of the picture elements 14 has been vertically lengthened so that a larger number of the plurality of scanning signal lines or the plurality of video signal lines are drawn toward longer sides of the rectangular shape.

Specifically, the pixel 16 has been vertically partitioned into three, and each of the picture elements 14 for R, G, and B has been vertically lengthened. This provides a single pixel 16 with (i) three signal lines (video signal lines 35) in the vertical direction and (ii) a single signal line (a scanning signal line 32) in a transverse direction. As a result, the number of the signal lines (video signal lines 35) which are drawn toward the longer sides of the rectangular shape has been larger than that of the signal lines (scanning signal lines 32).

Note that a picture element electrode 60 is provided in a substantially entire region of the picture element 14. In view of this, the picture element electrode 60 has also been vertically lengthened in accordance with the picture element 14 which has been vertically lengthened as described earlier.

(Transversely-Lengthened Picture Element Electrode)

The following suggests an arrangement of a picture element 14 including a picture element electrode 60 which is transversely lengthened, in contrast to the picture element electrode 60 which is vertically lengthened as described earlier. Such an arrangement intends to reduce the number of video signal lines 35 so as to achieve a lower power consumption. The following description is given with reference to (b) of FIG. 16. (b) of FIG. 16 is a drawing illustrating, similarly to (a) of FIG. 16, an arrangement of the picture elements 14 in a liquid crystal display device 10 which realizes color display.

According to the liquid crystal display device 10 including the picture element electrodes 60 which are transversely lengthened, a single pixel 16 is partitioned into three not vertically but transversely (see (b) of FIG. 16). Then, three picture elements 14 which are transversely lengthened are provided in the single pixel 16. Note that the three picture elements 14 correspond to R, G, and B, respectively.

The picture element electrode 60 is also transversely lengthened in accordance with the picture element 14 which is transversely lengthened.

Employment of the arrangement causes an increase in number of the scanning signal lines 32 provided in the transverse direction to 3 (three), but allows a reduction in number of the video signal lines 35 provided in the vertical direction to 1 (one). This can reduce a driver for the video signal lines 35 which consumes more power and is higher in production cost in general than a driver for the scanning signal lines 32. This allows a lower power consumption and a production cost reduction.

Note that a circuit configuration of the driver for the scanning signal lines 32 is simpler than that of the driver for the video signal lines 35. In view of this, circuits of the respective drivers for the scanning signal lines 32 and the video signal lines 35 are provided, together with the scanning signal lines 32 and the video signal lines 35, on a single substrate, whereby a further reduction in production cost can be achieved.

Note again that the circuit configuration of the driver for the scanning signal lines 32 is simpler than that of the driver for the video signal lines 35. This allows (i) a reduction in region where the drivers are mounted and (ii) a contribution to miniaturization of the liquid crystal display device 10.

Note again that the circuit configuration of the driver for the scanning signal lines 32 is simpler than that of the driver for the video signal lines 35. In view of this, it is also easy to provide a single driver with the circuits of the respective drivers for the scanning signal lines 32 and the video signal lines 35. In this case, the number of the drivers can be reduced. This can contribute to (i) miniaturization of the liquid crystal display device 10 and (ii) a reduction in cost of mounting the drivers.

For example, Patent Literature 1 discloses a liquid crystal display device including transversely-lengthened picture element electrodes as mentioned above.

(Patent Literature 1)

Namely, in order to achieve a reduction in production cost and a lower power consumption, Patent Literature 1 discloses a liquid crystal display device including picture element electrodes which are lengthened in an extended direction of scanning signal lines.

Note here that in order to reduce a display defect such as a flicker, it is generally necessary that a parasitic capacitance generated between a picture element electrode and a scanning signal line which drives a picture element of the picture element electrode (this parasitic capacitance is hereinafter denoted as Cgd) be small with respect to a total of parasitic capacitances placed on the picture element electrode (this total is hereinafter denoted as Cpix). For example, when the scanning signal line is changed from an electric potential for turning ON the picture element electrode to one for turning OFF the picture element electrode, there occurs a change in electric potential of the picture element electrode in accordance with a ratio of Cgd to Cpix and a scale of the change in electric potential of the scanning signal line. In a case where AC driving is carried out for the prevention of deterioration in liquid crystal, a display abnormality such as a flicker or a luminance abnormality occurs if voltages applied to the liquid crystal are different between cases where (i) the picture element electrode has a positive electric potential with respect to a common electrode and (ii) the picture element electrode has a negative electric potential with respect to the common electrode. This requires the change in electric potential of the picture element electrode to be corrected by controlling a video signal or an electric potential of the common electrode. Note here that it is impossible to appropriately carry out the correction in a case where (i) the correction cannot be carried out for each tone, (ii) a range of correction values is narrow due to voltage limitation, or (iii) the correction can be carried out only in given (e.g., 50 mV) increments. This reduces allowance against a display defect and Cgd is therefore required to be as small as possible. Further, it is preferable that a liquid crystal capacitance included in Cpix and especially a storage capacitance be large. Note here that (i) the liquid crystal capacitance refers to a capacitance generated, via a liquid crystal material, between the picture element electrode and the common electrode and (ii) the storage capacitance refers to a capacitance juxtaposed to the liquid crystal capacitance.

As for this point, according to the arrangement disclosed in Patent Literature 1, a picture element electrode is extended beyond a scanning signal line, and a reduction in Cgd can be expected by shielding, with an adjacent picture element electrode, an electric field occurring toward a place where the liquid crystal material is sandwiched.

Patent Literature 1

Japanese Patent Application Publication, Tokukaihei, No. 11-167127 A (Publication Date: Jun. 22, 1999)

SUMMARY OF INVENTION

However, for example, according to the arrangement disclosed in Patent Literature 1, there is a problem that generation of Cgd can be controlled to some extent but insufficiently.

Namely, Cgd is apt to increase because a closest distance between the scanning signal line and the transversely-lengthened picture element electrode will become enlarged. In view of this, the arrangement in which the picture element electrode is superposed on the scanning signal line can only insufficiently control the generation of Cgd.

(Storage Capacitance)

In addition, according to the arrangement, there is a problem that a display quality is highly likely to deteriorate because no desired voltage is applied to liquid crystal molecules.

Namely, according to the arrangement which is disclosed in Patent Literature 1 and in which a storage capacitance is formed by overlapping an adjacent scanning signal line and a picture element electrode (or an electrode connected to the picture element electrode) via an insulating film, a load on a scanning signal line increases, so that a signal delay is highly likely to be enlarged. Particularly in a case where the number of video signal lines is reduced and the number of scanning signal lines is increased, a selection period for a single scanning signal line is shortened unless a frequency at which a single screen is rewritten is reduced. For this reason, an enlarged signal delay occurring in the scanning signal line makes it impossible to secure time enough for the video signal to be written in the picture element electrode. Namely, a potential of the picture element electrode may fail to reach a desired value. Such a failure of the potential to reach the desired value prevents the liquid crystal molecules from orienting in a desired direction. This causes a deterioration in display quality. Note that particularly recently, the number of scanning signal lines tends to increase in response to a demand for a higher definition.

The present invention has been made in view of the above problems, and an object of the present invention is to provide a liquid crystal display device which allows (i) prevention of decreases in aperture ratio and storage capacitance, (ii) a reduction in parasitic capacitance generated between a picture element electrode and a scanning signal line which drives a picture element of the picture element electrode, and (iii) prevention of a deterioration in display quality.

In order to attain the object, a liquid crystal display device of the present invention including: a first substrate; a second substrate; a liquid crystal material sealed between the first substrate and the second substrate; a plurality of scanning signal lines on the first substrate; a plurality of video signal lines on the first substrate which intersect the respective plurality of scanning signal lines; a plurality of switching elements on the first substrate which are electrically connected to the respective plurality of scanning signal lines and the respective plurality of video signal lines; and a plurality of picture element electrodes on the first substrate which are provided in a matrix pattern and electrically connected to the respective switching elements, the picture element electrodes having a longer length in a direction along the scanning signal lines than in a direction along the video signal lines, the liquid crystal display device includes: storage capacitor lines provided on the first substrate along the respective scanning signal lines, the storage capacitor lines overlapping the respective picture element electrodes via an insulating film in plan view.

According to the arrangement, it is possible to reduce parasitic capacitances in a liquid crystal display device including transversely-lengthened picture element electrodes as described above. This is to be described below.

Each of the parasitic capacitances is generated between a picture element electrode and a scanning signal line which drives a picture element of the picture element electrode. According to the liquid crystal display device including the transversely-lengthened picture element electrodes, the picture element electrode and the scanning signal line face each other with a long distance. In view of this, the liquid crystal display device including the transversely-lengthened electrodes is likely to have large parasitic capacitances.

As for this point, according to the liquid crystal display device as arranged above, the storage capacitor lines are provided along the respective scanning signal lines, and further overlap the respective picture element electrodes via the insulating film in plan view.

Accordingly, each of the storage capacitor lines serves as a shielding conductor, i.e., a shield electrode. Electric fields between the respective picture element electrodes and the respective scanning signal lines are shielded. This makes it difficult for capacitances to be formed between the respective picture element electrodes and the respective scanning signal lines.

Note that the storage capacitor lines, which are provided along the respective scanning signal lines, make it difficult to cause a decrease in aperture ratio of a picture element.

Note also that the storage capacitor lines, which overlap the respective picture element electrodes via the insulating film in plan view, cause storage capacitances to be easily formed between the respective picture element electrodes and the respective storage capacitor lines.

Because of these, the liquid crystal display device as arranged above allows (i) prevention of decreases in aperture ratio and storage capacitance, (ii) a reduction in parasitic capacitance generated between a picture element electrode and a scanning signal line which drives a picture element of the picture element electrode, and (iii) prevention of a deterioration in display quality.

The liquid crystal display device of the present invention is preferably arranged such that, for each of the picture element electrodes, a storage capacitor line corresponding to that picture element electrode is juxtaposed to that one of the plurality of scanning signal lines which is electrically connected to that picture element electrode via a corresponding switching element.

According to the arrangement, the storage capacitor line is juxtaposed to that one of the plurality of scanning signal lines which is electrically connected to that picture element electrode, not to a picture element electrode which is adjacent to that picture element electrode.

This (i) makes it easier for the storage capacitor line to function as the shield electrode against a capacitance generated between that picture element electrode and that one of the plurality of scanning signal lines, (ii) allows the storage capacitor line to easily overlap that picture element electrode in plan view, and (iii) can prevent a decrease in aperture ratio due to the provision of the storage capacitor line.

The liquid crystal display device of the present invention is preferably arranged such that: for each of the picture element electrodes, a storage capacitor line corresponding to that picture element electrode is juxtaposed to that one of the plurality of scanning signal lines which is electrically connected to that picture element electrode via a corresponding switching element; and the storage capacitor line overlaps that picture element electrode via the insulating film in plan view in such a manner that the storage capacitor line overlaps an end side of that picture element electrode which end side faces this scanning signal line.

According to the arrangement, the storage capacitor line overlaps that picture element electrode in such a manner that the storage capacitor line overlaps the end side of that picture element electrode which end side faces that one of the plurality of scanning signal lines. In other words, that picture element electrode does not protrude toward that one of the plurality of scanning signal lines.

This makes it easier for the storage capacitor line to function as the shield electrode against a capacitance generated between that picture element and the scanning signal line.

This can further prevent the parasitic capacitances from being generated.

The liquid crystal display device of the present invention is preferably arranged such that each of the picture element electrodes overlaps, via the insulating film in plan view, that one of the plurality of scanning signal lines which is provided so as to drive a picture element electrode which is adjacent to that picture element electrode in a direction in which the plurality of video signal lines extend.

The liquid crystal display device of the present invention is preferably arranged such that each of the plurality of picture element electrodes overlaps, via the insulating film in plan view, that one of the plurality of scanning signal lines which is provided so as to drive a picture element electrode that is adjacent to that picture element electrode in the direction in which the plurality of video signal lines extend, and an end side of that picture element electrode extends beyond this scanning signal line in plan view.

According to the arrangement, the picture element electrode (that picture element electrode) overlaps that one of the plurality of scanning signal lines which is connected to the picture element electrode which is adjacent to that picture element electrode (this picture element electrode is hereinafter referred to as an adjacent picture element electrode) (this scanning signal line is hereinafter referred to as an adjacent scanning signal line). Alternatively, that picture element electrode preferably extends beyond this scanning signal line.

This makes it easy for that picture element electrode to function as the shielding conductor against a parasitic capacitance generated between the adjacent picture element electrode and the adjacent scanning signal line.

This can further prevent the parasitic capacitance from being generated between the adjacent picture element electrode and the adjacent scanning signal line.

The liquid crystal display device of the present invention is preferably arranged such that: each of the plurality of picture element electrodes overlaps, via the insulating film in plan view, that one of the plurality of scanning signal lines which is provided so as to drive a picture element electrode which is adjacent to that picture element electrode in the direction in which the plurality of video signal lines extend, and an end side of that picture element electrode extends beyond this scanning signal line in plan view; and the end side of that picture element electrode overlaps, in plan view, a corresponding storage capacitor line provided along this scanning signal line.

According to the arrangement, the picture element electrode (that picture element electrode) extends beyond that one of the plurality of scanning signal lines (the adjacent scanning signal line) which is connected to the picture element electrode (the adjacent picture element electrode) which is adjacent to that picture element electrode, and further overlaps the corresponding storage capacitor line.

This allows a storage capacitance to be formed in a part where that picture element electrode and the corresponding storage capacitor line overlap with each other.

This can prevent a decrease in storage capacitance, and facilitates an increase in storage capacitance without causing a great decrease in aperture ratio.

The liquid crystal display device of the present invention is preferably arranged such that each of the plurality of picture element electrodes overlaps, via the insulating film in plan view, only that one of the plurality of scanning signal lines which is provided so as to drive a picture element electrode which is adjacent to that picture element electrode in the direction in which the plurality of video signal lines extend.

According to the arrangement, the picture element electrode (that picture element electrode) overlaps only that one of the plurality of scanning signal lines (the adjacent scanning signal line) which is connected to the picture element electrode (the adjacent picture element electrode) which is adjacent to that picture element electrode. In other words, that picture element electrode overlaps no scanning signal line that drives that picture element electrode.

This can prevent the parasitic capacitance from being generated between that picture element electrode and that one of the plurality of scanning signal lines which drives that picture element electrode.

The liquid crystal display device of the present invention is preferably arranged such that in plan view, the plurality of picture element electrodes are provided on a protecting film which is provided so as to cover the plurality of video signal lines.

According to the arrangement, the protecting film is provided between the plurality of picture element electrodes and the plurality of video signal lines. This can prevent a leak from occurring between the respective plurality of picture element electrodes and the respective plurality of video signal lines.

The liquid crystal display device of the present invention is preferably arranged such that: storage capacitor counter electrodes are provided in a layer above the respective storage capacitor lines via the insulating film; the storage capacitor counter electrodes are electrically connected to the respective plurality of picture element electrodes; and in plan view, each of the storage capacitor counter electrodes has their end sides which are located within a region of a corresponding storage capacitor line.

According to the arrangement, the end sides of the storage capacitor counter electrode are located within the region of the corresponding storage capacitor line. In other words, the storage capacitor counter electrode reaches no edge part of the corresponding storage capacitor line.

This causes a change in storage capacitance to be less likely to occur because the storage capacitor counter electrode is provided with a greater positional allowance with respect to the corresponding storage capacitor line.

Note that it is possible to cause a separation into blocks to be less likely to occur when a so-called step-and-repeat exposure is carried out.

Note also that it is possible to prevent (i) a leak between a storage capacitor line and a drain electrode of a switching element and/or (ii) disconnection in a connection section between the drain electrode and a storage capacitor counter electrode. The leak and/or the disconnection may occur in an arrangement in which the storage capacitor counter electrode is directly connected to the drain electrode.

The liquid crystal display device of the present invention is preferably arranged such that: storage capacitor counter electrodes are provided in a layer above the respective storage capacitor lines via the insulating film; and the storage capacitor counter electrodes are made of a material of which drain electrodes of the respective switching elements are made.

According to the arrangement, it is possible to form the storage capacitor counter electrodes and the drain electrodes by a single production process. This can prevent an increase in production cost.

The liquid crystal display device of the present invention is preferably arranged such that the storage capacitor counter electrodes are extending parts of the respective drain electrodes of the respective switching elements.

According to the arrangement, the storage capacitor counter electrodes are provided as the extending parts of the respective drain electrodes.

Accordingly it is possible to simplify production steps, unlike an arrangement in which the storage capacitor counter electrodes and the drain electrodes of the respective switching elements are electrically connected by making a detour through another layer by use of a contact hole or the like.

The liquid crystal display device of the present invention is preferably arranged such that the storage capacitor counter electrodes respectively include storage capacitor counter electrode extending sections extended along the respective storage capacitor lines.

According to the arrangement, the storage capacitor counter electrodes are extended along the respective storage capacitor lines.

This allows an increase in area of a region where the storage capacitor counter electrodes and the respective storage capacitor lines overlap. This makes it easy to obtain large storage capacitances without causing a great decrease in aperture ratio.

The liquid crystal display device of the present invention is preferably arranged to include: on the second substrate, color filters which correspond to the respective picture element electrodes provided on the first substrate; wherein: the color filters are different in color between adjacent ones in the direction in which the plurality of video signal lines extend, so that color filters which correspond to picture element electrodes adjacent to each other are different in color in the direction in which the plurality of video signal lines extend; black matrices are provided in a boundary region between the respective color filters of different colors; and the storage capacitor lines at least partially overlap the respective black matrices in plan view.

According to the arrangement, it is possible to prevent a decrease in aperture ratio due to the provision of the storage capacitor lines. This is because the storage capacitor lines are provided so as to overlap the respective black matrices.

The liquid crystal display device of the present invention is preferably arranged such that (i) the boundary region between the respective color filters of different colors and (ii) a boundary region between the respective picture element electrodes which are adjacent in the direction in which the plurality of video signal lines extend at least partially overlap in plan view.

According to the arrangement, the boundary region between the respective color filters and the boundary region between the respective picture element electrodes overlap with each other.

This makes it possible to secure a large liquid crystal capacitance because the first substrate and the second substrate can be assembled with a greater positional allowance.

Note here that the liquid crystal capacitance refers to a capacitance generated, via a liquid crystal material, between a picture element electrode and a common electrode.

The liquid crystal display device of the present invention is preferably arranged to include a common electrode above the color filters.

According to the arrangement, the common electrode is provided above the color filters. This allows an efficient application of a voltage to the liquid crystal material.

The liquid crystal display device of the present invention can be arranged such that the color filters of different colors are not in contact with each other in the boundary region between the respective color filters of different colors.

According to the arrangement, the different colors are spaced from each other along a color boundary between the color filters. This can prevent such a case that the color filters rise toward the first substrate in a part where the different colors overlap. This can also prevent a leak between the respective picture element electrodes and the common electrode even in a case where (a) an electrically conductive foreign matter is included in a liquid crystal layer or (b) a display surface of a display device is pressed with a finger. Note that the liquid crystal layer has a larger thickness along the color boundary between the color filters than in the other part of the liquid crystal layer by a thickness of the color filters. According to the arrangement, (i) the boundary region where the liquid crystal layer has the larger thickness and (ii) a boundary between the corresponding picture element electrodes, that is, a region where no picture element electrode is provided at least partially overlap with each other in plan view. This can prevent a decrease in liquid crystal capacitance. This can reduce an influence of the parasitic capacitances on a display quality.

The liquid crystal display device of the present invention can be arranged such that adjacent ones of the color filters of different colors overlap with each other in a boundary region between the adjacent ones of the color filters of different colors.

According to the arrangement, the adjacent ones of the color filters of different colors overlap with each other. Therefore, no region where the liquid crystal layer has a larger thickness than in the other region thereof is formed. This can prevent a decrease in liquid crystal capacitance. Note that though rising toward the first substrate, the adjacent ones of the color filters at least partially overlap with each other in plan view, along a color boundary of the adjacent ones of the color filters, a boundary between adjacent ones of the picture element electrodes, that is, a region where no picture element electrode is provided. This can prevent a leak between the respective adjacent ones of the picture element electrodes and the common electrode even in a case where (a) an electrically conductive foreign matter is included in a liquid crystal layer or (b) a display surface of a liquid crystal display device is pressed with a finger.

As described earlier, according to the liquid crystal display device of the present invention, the storage capacitor lines are provided, on the first substrate, along the respective scanning signal lines, and the storage capacitor lines overlap the respective picture element electrodes via the insulating film in plan view.

This brings about an effect of allowing (i) prevention of decreases in aperture ratio and storage capacitance, (ii) a reduction in parasitic capacitance generated between a picture element electrode and a scanning signal line which drives a picture element of the picture element electrode, and (iii) prevention of a deterioration in display quality.

BRIEF DESCRIPTION OF DRAWINGS

FIG. 14 is a drawing illustrating a schematic arrangement of picture elements of a liquid crystal display device.

REFERENCE SIGNS LIST

Figure 1:
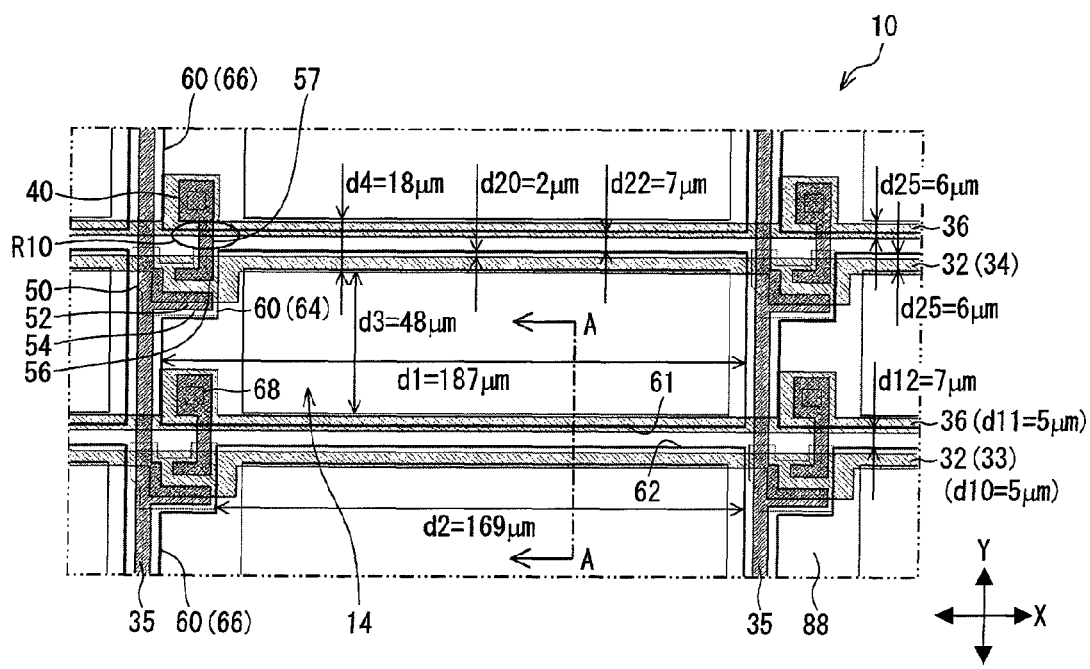
FIG. 1 is a drawing illustrating a schematic arrangement of picture elements of a liquid crystal display device in accordance with an embodiment of the present invention.

10 Liquid crystal display device
22 First substrate
24 Second substrate
28 Liquid crystal material
32 Scanning signal line
35 Video signal line
36 Storage capacitor line
40 Storage capacitor counter electrode
42 Storage capacitor counter electrode extending section
50 Switching element
56 Drain electrode
60 Picture element electrode
61 End side facing scanning signal line
62 End side facing storage capacitor line
70 Insulating film
74 Protecting film
80 Color filter
88 Black matrix
90 Common electrode

DESCRIPTION OF EMBODIMENTS

[First Embodiment]

The following description discusses an embodiment of the present invention with reference to FIGS. 1 and 2, and FIGS. 12 through 15.

(Schematic Arrangement of Picture Element)

FIG. 1 is a drawing illustrating a schematic arrangement of picture elements 14 of a liquid crystal display device 10 of the present embodiment.

According to the liquid crystal display device 10 of the present embodiment, which is a so-called active matrix liquid crystal display device, the picture elements 14 include respective switching elements 50 (see FIG. 1).

In order to control the respective switching elements 50, a plurality of scanning signal lines 32 and a plurality of video signal lines 35 are provided so as to intersect each other. The respective switching elements 50 are provided at respective intersections of the plurality of scanning signal lines 32 and the plurality of video signal lines 35.

Note that a substantially rectangular region defined by a scanning signal line 32 and a video signal line 35 is regarded as a picture element 14 and the picture element 14 includes a picture element electrode 60.

The picture element electrode 60 of the present embodiment is transversely lengthened. Note here that a transverse direction refers to a direction shown by an arrow X and a vertical direction refers to a direction shown by an arrow Y (see FIG. 1).

According to the liquid crystal display device 10 of the present embodiment, the plurality of scanning signal lines 32 are provided in the transverse (arrow X) direction and the plurality of video signal lines 35 are provided in the vertical (arrow Y) direction. A distance between the respective plurality of video signal lines 35 is longer than that between the respective plurality of scanning signal lines 32.

This causes the picture element 14 defined by the scanning signal line 32 and the video signal line 35 to be transversely lengthened, and the picture element electrode 60 is accordingly transversely lengthened.

(Position of Storage Capacitor Line)

The following description more specifically discusses the arrangement of the picture elements 14.

The liquid crystal display device 10 of the present embodiment has a feature that a storage capacitor line 36 is provided along the scanning signal line 32. Specifically, in a case where a picture element 14 and a picture element electrode 60 included in this picture element 14 is targeted, the storage capacitor line 36 which forms a storage capacitance (Ccs) in the picture element 14 is juxtaposed to the scanning signal line 32 which drives the picture element 14 (a driving scanning signal line 33).

(Overlap between the Storage Capacitor Line and Picture Element Electrode)

The storage capacitor line 36 overlaps the picture element electrode 60 in plan view.

Note here that according to the liquid crystal display device 10 of the present embodiment, the storage capacitor line 36 overlaps the picture element electrode 60 in such a manner that the storage capacitor line 36 overlaps an end side 61 of the picture element electrode 60. The end side 61 faces the scanning signal line 32 (the driving scanning signal line 33). In other words, the end side 61 is provided above the storage capacitor line 36 but not beyond the storage capacitor line 36 in plan view.

(Cross Section of the Picture Element)

A further description is given below with reference to FIG. 2, which is a cross-sectional view taken from the line A-A of FIG. 1.

According to the liquid crystal display device 10 of the present embodiment, a liquid crystal material 28, which serves as a liquid crystal layer, is sandwiched between two substrates which face each other (a first substrate 22 and a second substrate 24).

(First Substrate)

The scanning signal line 32 and the storage capacitor line 36 are provided on the first substrate 22, which is a so-called array substrate. Further, a gate insulating film 72 and a protecting film 74 each serving as an insulating film 70 are provided on the scanning signal line 32 and the storage capacitor line 36. In addition, the picture element electrode 60 is provided on the protecting film 74.

Note that a material of which the insulating film 70 including at least the protecting film 74 is made is not particularly limited. For example, it is possible to form the insulating film 70 as (i) an inorganic film monolayer, (ii) an organic film monolayer, or (iii) a double-layered film in which an inorganic film and an organic film are layered.

Note that it is possible to provide, on the video signal line 35, the insulating film 70 including at least the protecting film 74 for the purpose of protecting the video signal line 35.

(Second Substrate)

In contrast, on the second substrate 24, which is a so-called color filter substrate, (i) a black matrix 88 provided so as to correspond to respective picture elements 14 and (ii) color filters 80 provided so as to correspond to respective colors are provided. A common electrode 90 is provided on the color filters 80. Note that an alignment film, which is provided on the common electrode 90, is omitted in FIG. 2.

(Overlap between the Storage Capacitor Line and the Picture Element Electrode)

Figure 2:
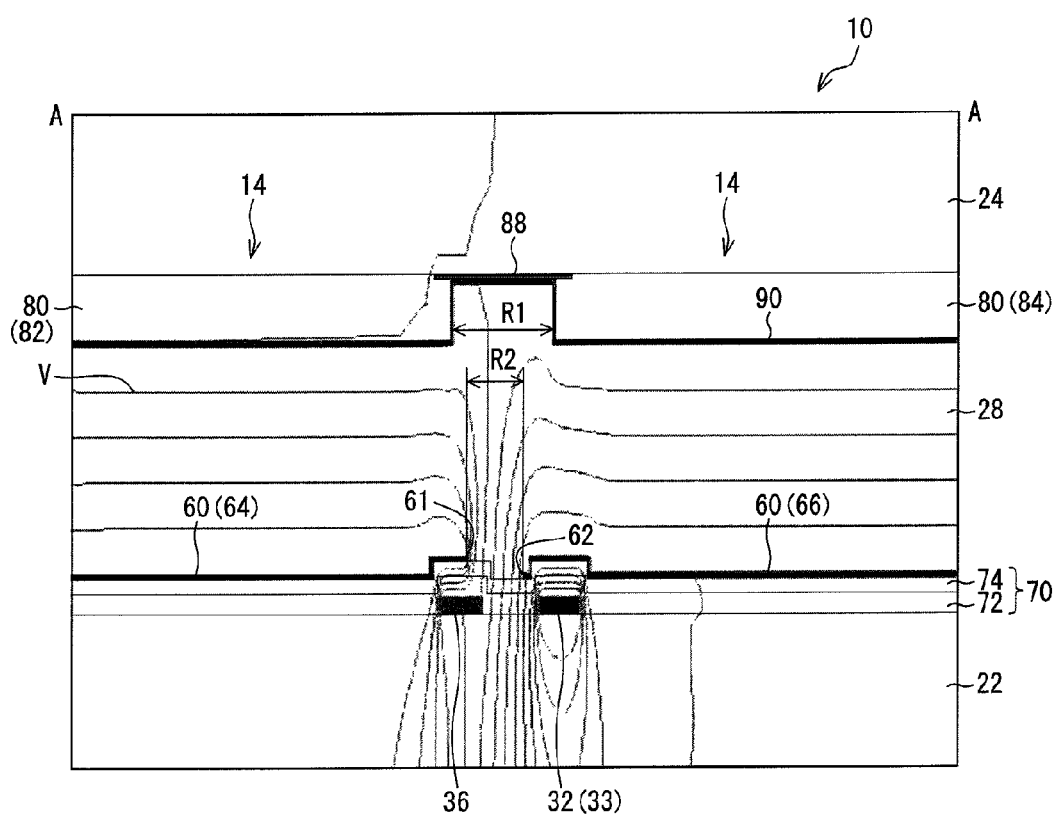
FIG. 2 is a cross-sectional view taken from the line A-A of FIG. 1.

The following description more specifically discusses a state of overlap and a positional relationship between sections of the liquid crystal display device 10 with reference to the cross-sectional view of FIG. 2.

Note that the end side 61 of the picture element electrode 60 which end side faces the scanning signal line 32 remains above the storage capacitor line 36 so as not to protrude from the storage capacitor line 36 toward the scanning signal line 32 which is adjacent to the storage capacitor line 36.

(Position of the Storage Capacitor Line)

Note also that the storage capacitor line 36, which is juxtaposed to the scanning signal line 32 as described earlier, is provided so as to be closer to a picture element electrode 60 (a driving picture element electrode 64) as compared to the driving scanning signal line 33, which serves as the scanning signal line 32 for driving the driving picture element electrode 64.

(Overlap between Scanning Signal Line and the Picture Element Electrode)

The following description discusses a positional relationship between the scanning signal line 32 and the picture element electrode 60.

According to the liquid crystal display device 10 of the present embodiment, the scanning signal line 32 overlaps the picture element electrode 60 in plan view (see FIG. 2). Specifically, the scanning signal line 32 overlaps an adjacent picture element electrode 66 which is the picture element electrode 60 adjacent to the driving picture element electrode 64. The driving picture element electrode 64 is the picture element electrode 60 connected to the scanning signal line 32.

In other words, a driving picture element electrode 64 and a driving scanning signal line 33, which are regarded as a combination of a picture element electrode 60 of a picture element 14 and a scanning signal line 32 for driving this picture element 14, do not overlap with each other. Instead, an adjacent picture element electrode 66, which is the picture element electrode 60 adjacent to the driving picture element electrode 64, overlaps the driving scanning signal line 33.

An end side 62 of the adjacent picture element electrode 66 which end side faces the storage capacitor line 36 extends beyond the driving scanning signal line 33 in plan view.

(Insulating Film)

The gate insulating film 72 and the protecting film 74 each serving as the insulating film 70 are provided between (i) the picture element electrode 60 (driving picture element electrode 64) and the storage capacitor line 36, and (ii) the picture element electrode 60 (adjacent picture element electrode 66) and the scanning signal line 32 (driving scanning signal line 33). For this reason, the picture element electrode 60 overlaps in plan view but is not electrically connected to the storage capacitor line 36 or the scanning signal line 32.

(Storage Capacitor Counter Electrode)

The following description discusses formation of the storage capacitance (Ccs) in the storage capacitor line 36.

According to the liquid crystal display device 10 of the present embodiment, storage capacitor counter electrodes 40 are provided in the respective picture elements 14 so as to overlap the respective storage capacitor lines 36 in plan view. Then, the storage capacitances (Ccs) are formed between the respective storage capacitor counter electrodes 40 and the respective storage capacitor lines 36. The following description specifically discusses the formation.

(The Storage Capacitor Counter Electrode)

According to the liquid crystal display device 10 of the present embodiment, each of the storage capacitor counter electrodes 40 is formed as an extending part of a drain electrode 56 of the switching element 50.

Namely, a gate electrode 52, a source electrode 54, and the drain electrode 56, each being included in the switching element 50 constituted by a TFT (Thin Film Transistor) element, are connected to the scanning signal line 32, the video signal line 35, and the picture element electrode 60, respectively.

According to the present embodiment, an overlapping part where the extending part of the drain electrode 56 overlaps the storage capacitor line 36 in plan view before being connected to the picture element electrode 60. This overlapping part functions as the storage capacitor counter electrode 40. In other words, the storage capacitor counter electrode 40 is connected to the drain electrode 56 via a drain electrode connection section 57.

Note that in a region where the extending part of the drain electrode 56 is connected to the picture element electrode 60 via a contact hole 68, the extending part has a larger area than in the other region thereof and is substantially rectangular. This causes the storage capacitor counter electrode 40 of the present embodiment also to be substantially rectangular. Note that the extending part can have an alternative shape, for example, can be square or circular.

Note also that the storage capacitor counter electrode 40 and the drain electrode 56 are made of an identical material according to the arrangement.

(The Storage Capacitor Line)

In contrast, a part of the storage capacitor line 36 which part overlaps the storage capacitor counter electrode 40 in plan view has a larger width than the other part of the storage capacitor line 36. Then, the storage capacitor line 36 covers the storage capacitor counter electrode 40. In other words, the storage capacitor counter electrode 40 does not protrude from the storage capacitor line 36.

Namely, the storage capacitor counter electrode 40, which is the extending part of the drain electrode 56, overlaps the storage capacitor line 36. In an overlapping part where the storage capacitor counter electrode 40 overlaps the storage capacitor line 36, the storage capacitor counter electrode 40 and the storage capacitor line 36 have respective larger areas than in the respective other parts thereof. Accordingly, the overlapping part has a larger area. Note, however, that the storage capacitor counter electrode 40 is arranged in the overlapping part so as not to protrude from the storage capacitor line 36 in plan view.

Note that the storage capacitor counter electrode 40 is electrically connected to the picture element electrode 60 via the contact hole 68 as described earlier. The storage capacitor counter electrode 40 is the extending part of the drain electrode 56. In view of this, the picture element 14 is driven by the switching element 50 via the storage capacitor counter electrode 40.

Note here that wirings of at least the scanning signal line 33, the storage capacitor line 36, and the video signal line 35 are made of a highly light blocking metal such as Al, Ta, Ti, Cr, Cu, or Mo, or a monolayer or a layered alloy of such highly light blocking metals. Namely, according to a so-called transmissive liquid crystal display device, a picture element electrode does not serve as a display region in a part where the picture element electrode overlaps the wirings of at least the scanning signal line 33, the storage capacitor line 36, and the video signal line 35.

(Positional Relationship between the First and Second Substrates)

The following description discusses a positional relationship between (a) the picture element electrodes 60 and the like provided on the first substrate 22 and (b) the color filters 80 and the like provided on the second substrate 24, with reference to FIG. 2.

(Black Matrix and the Storage Capacitor Line)

First, a positional relationship between the black matrix 88 and the storage capacitor line 36 is to be described.

As described earlier, on the second substrate 24 of the present embodiment, (i) the black matrix 88 provided so as to correspond to respective picture elements 14 and (ii) color filters 80 provided so as to correspond to the respective colors are provided.

Note here that according to the liquid crystal display device 10 of the present embodiment, the storage capacitor line 36 provided on the first substrate 22 and the black matrix 88 provided on the second substrate 24 are assembled so as to overlap with each other in plan view.

Specifically, on the second substrate 24, a red color filter 82 and a green color filter 84 which are the color filters 80 of different colors are provided so as to correspond to the picture element electrodes 64 and 66, respectively (see FIG. 2). The picture element electrodes 64 and 66 are adjacent in a direction in which the video signal lines (not illustrated) extend. The black matrix 88 is provided between the red color filter 82 and the green color filter 84 (see FIG. 2). According to the so-called transmissive liquid crystal display device, this black matrix 88 prevents a display quality deterioration by preventing light of a backlight provided below the first substrate from passing through part of a liquid crystal layer in which part liquid crystals are unfavorably oriented. The black matrix 88 also prevents a display defect such as a color mixture, in a case where (i) a picture element electrode and (ii) a region different from a color filter corresponding to the picture element electrode such as (a) a color filter corresponding to an adjacent picture element electrode, (b) a part where no color filter is provided, or (c) a part where color filters of different colors overlap in plan view due to a positional misalignment between the first substrate and the second substrate assembled with each other.

The storage capacitor line 36 provided on the first substrate 22 is located in a lower region of the black matrix 88. Specifically, according to the present embodiment, the two substrates (the first substrate 22 and the second substrate 24) are arranged and assembled so that the storage capacitor line 36 entirely falls within the lower region of the black matrix 88 in its width direction, that is, does not protrude from the lower region.

Note that an arrangement in which the black matrix 88 and the storage capacitor line 36 overlap with each other is not limited to the above arrangement. It is possible to arrange the storage capacitor line 36 to partially overlap the black matrix 88.

Note that it is possible in a transmissive display to prevent an increase in invalid region, which does not contribute to a display, by at least partially overlapping regions of the storage capacitor line 36 and the black matrix 88 each of which regions does not serve as a display region.

(Color Filter and the Picture Element Electrode)

The following description discusses a positional relationship between the color filters 80 and the respective picture element electrode 60.

The color filters 80 of different colors of the present embodiment are provided so as to be separate from each other without overlapping or making contact with each other (see FIG. 2). This produces, on the second substrate 24, a region where no color filter 80 is provided (refer to a boundary region R1 between the color filters 80 in FIG. 2).

In contrast, a plurality of the picture element electrodes 60 are provided on the first substrate 22 electrically separately from each other so as to be controlled separately from each other. This produces, between the picture element electrodes 60 which are adjacent to each other (e.g., between the driving picture element electrode 64 and the adjacent picture element electrode 66), a region where no picture element electrode 60 is provided (refer to a boundary region R2 between the picture element electrodes 60 in FIG. 2).

Note here that according to the liquid crystal display device 10 of the present embodiment, the boundary region R1 between the color filters 80 and the boundary region R2 between the picture element electrodes 60 at least partially overlap with each other in plan view.

For example, according to the arrangement illustrated in FIG. 2, the boundary region R2, which falls within the boundary region R1, overlaps the boundary region R1 so as not to protrude from the boundary region R1.

Note that an arrangement in which the boundary region R1 between the color filters 80 and the boundary region R2 between the picture element electrodes 60 overlap with each other is not limited to the above arrangement. It is possible to arrange the boundary region R2 between the picture element electrodes 60 to partially overlap the boundary region R1 between the color filters 80.

(Specific Arrangement and Electrical Property)

The following description discusses amounts of a parasitic capacitance (Cgd) and the like generated in the liquid crystal display device 10 of the present embodiment, with reference to a result of a simulation.

First, the arrangement of the picture element 14 is to be more specifically described with reference to FIG. 1.

The picture element electrode 60 has a substantially transversely-lengthened rectangular shape as described earlier (see FIG. 1). Note, however, that a part of the picture element electrode 60, in which part the switching element 50 is provided, is rectangularly removed.

In view of this, the picture element electrode 60 has, in a transverse direction X, a length of 187 μm (see d1 in FIG. 1) in a region of the picture element electrode 60 in which region no part of the picture element electrode 60 is removed and a length of 169 μm (d2) in the other region of the picture element electrode 60 in which region the part of the picture element electrode 60 is rectangularly removed. Note that a dot size is 198 μm×66 μm.

Note that as described earlier, on the second substrate 24, the black matrix 88 is provided so as to correspond to at least the picture element electrodes 60 provided on the first substrate 22. A region of each of the picture element electrodes 60 which region is not shielded by the black matrix 88 and the wirings of at least the scanning signal line 32 and the storage capacitor line 36 is referred to as an aperture region. According to the liquid crystal display device 10 of the present embodiment, the aperture region has a length of 48 μm (d3) in a vertical direction Y.

Note that a region, i.e., an invalid region (d4) in which the black matrix 88 and the wirings of at least the scanning signal line 32 and the storage capacitor line 36 are provided and which is located between the aperture region and an aperture region which is adjacent to the aperture region in the direction in which the video signal lines 35 extend has a width of 18 μm in the vertical direction Y.

The following description discusses widths of the wirings provided on the first substrate 22. First, the scanning signal line 32 has a width of 5 μm in a part of the scanning signal line 32 which part overlaps no switching element 50 (d10). The storage capacitor line 36 also has a width of 5 μm (d11). There is a gap of 7 μm between the scanning signal line 32 and the storage capacitor line 36 (d12).

The following description discusses at least a positional relationship between the picture element electrode 60 and the scanning signal line 32. The picture element electrode 60 (driving picture element electrode 64) of the present embodiment does not overlap the driving scanning signal line 33 which corresponds to the driving picture element electrode 64, but overlaps an adjacent scanning signal line 34 which drives a picture element 14 which is adjacent to the picture element 14. In such an overlapping state, the driving picture element electrode 64 extends beyond the adjacent scanning signal line 34 in plan view by a width of 2 μm (d20).

Note that according to the present embodiment, a gap between the picture element electrodes 60 which are adjacent in the direction in which the video signal lines 35 extend is set to 7 μm (d22) and a margin for combining the first substrate 22 and the second substrate 24 is set to 6 μm (refer to d25).

(Electrical Property)

The following description discusses the electrical property of the liquid crystal display device 10 of the present embodiment with reference to FIG. 2.

(Comparison Object)

First, the following description discusses liquid crystal display devices 10 so as to make comparisons, with reference to FIGS. 12 through 15.

Figure 12:
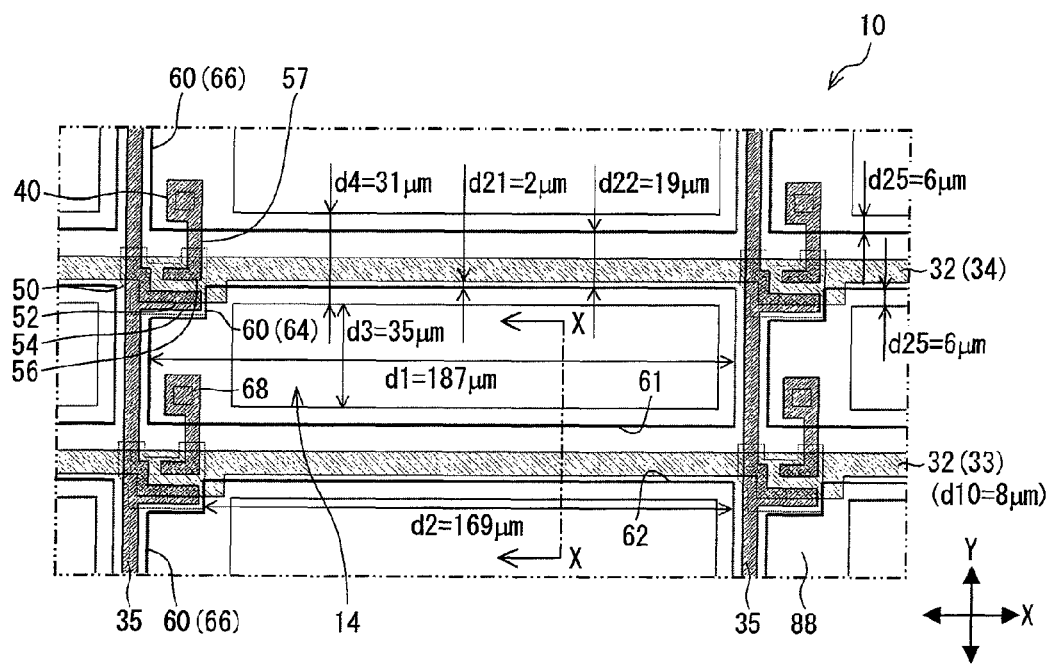
FIG. 12 is a drawing illustrating a schematic arrangement of picture elements of a liquid crystal display device.

Liquid crystal display devices whose arrangements are schematically illustrated in FIGS. 12 and 14, respectively, refer to the liquid crystal display devices 10 including no storage capacitor lines 36. FIG. 12 illustrates the liquid crystal display device 10 of a comparison object 1, and FIG. 14 illustrates the liquid crystal display device 10 of a comparison object 2.

Figure 13:
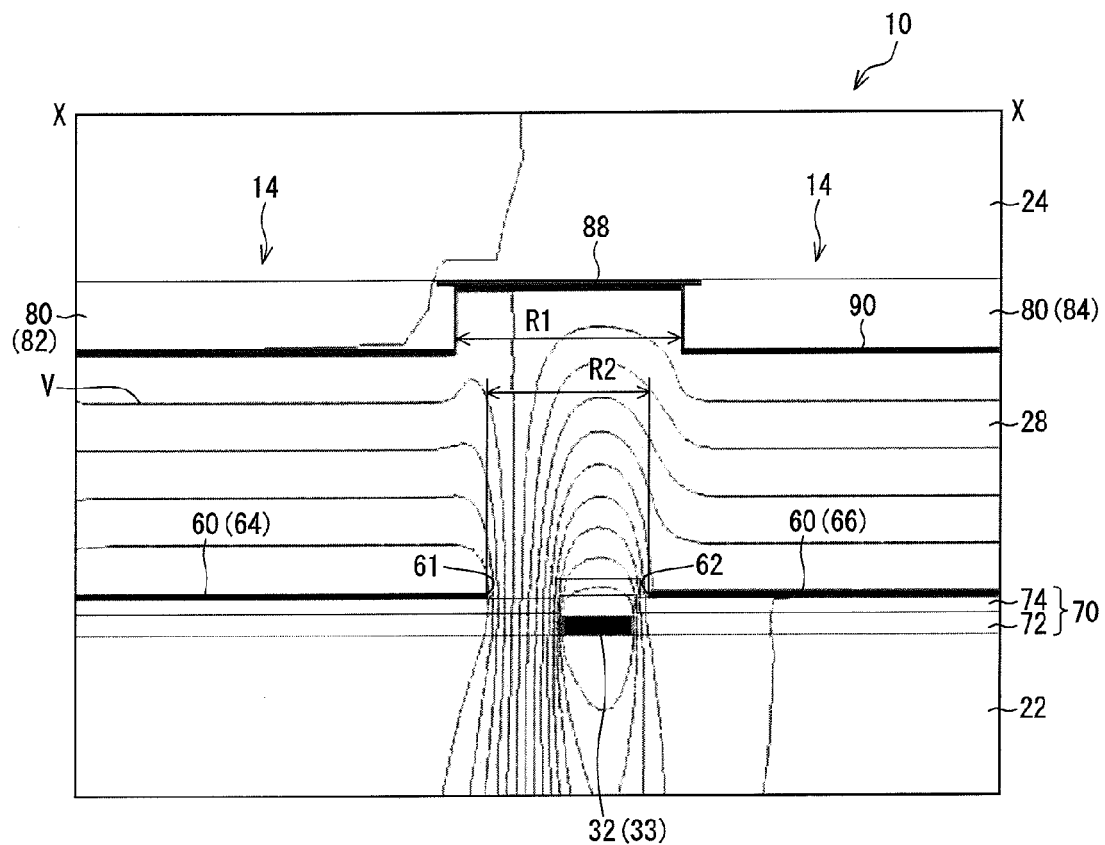
FIG. 13 is a cross-sectional view taken from the line X-X of FIG. 12.
Figure 15:
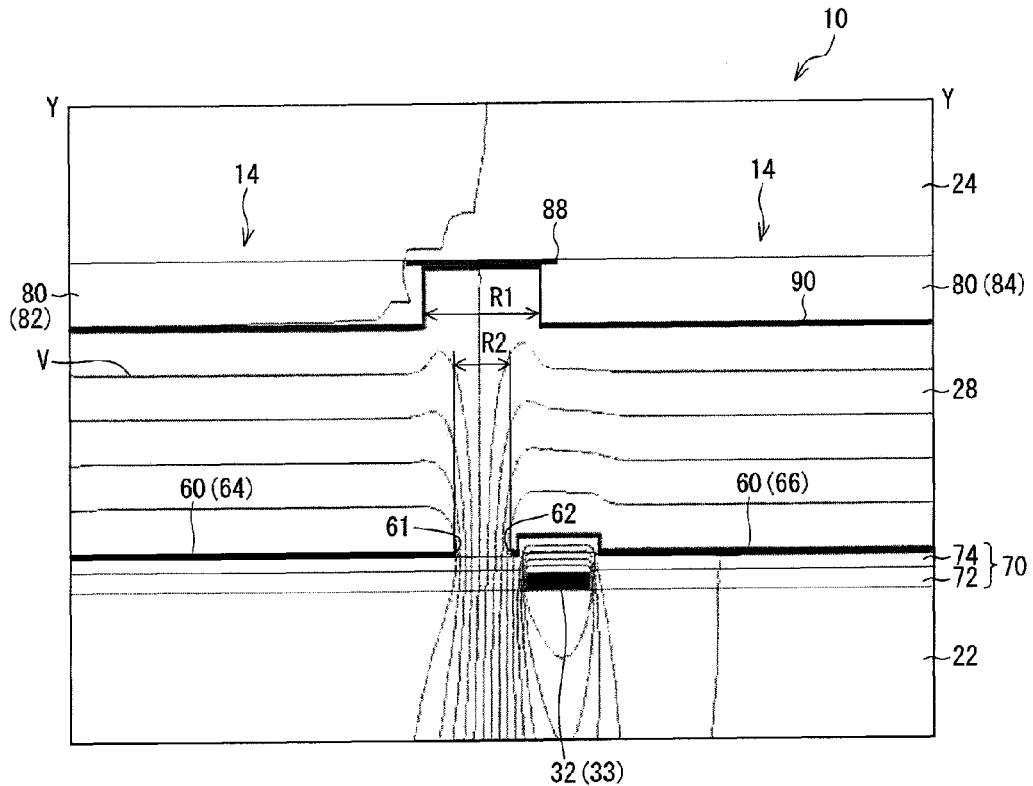
FIG. 15 is a cross-sectional view taken from the line Y-Y of FIG. 14.
Figure 16:
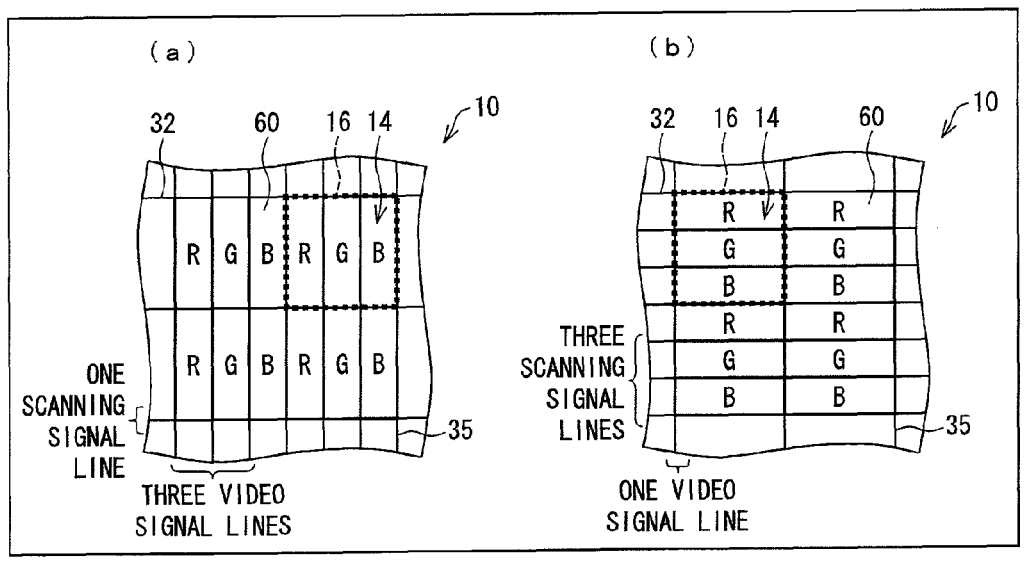
FIG. 16 is a drawing illustrating an arrangement of picture element electrodes.

FIG. 13 is a cross-sectional view taken from the line X-X of FIG. 12, and FIG. 15 is a cross-sectional view taken from the line Y-Y of FIG. 14.

(Comparison Object 1)

According to the liquid crystal display device 10 of the comparison object 1 (see FIG. 12), there is no storage capacitor line 36 provided and a picture element electrode 60 and a scanning signal line 32 do not overlap with each other, unlike the liquid crystal display device 10 of the present embodiment (see FIG. 1). Namely, the picture element electrode 60 and the scanning signal line 32 are spaced by approximately 2 μm (d21 in FIG. 12) without overlapping with each other.

Other members of the liquid crystal display device 10 of the comparison object 1 are arranged substantially similarly to those of the liquid crystal display device 10 of the present embodiment (see FIG. 1). In view of this, the following description discusses a main point of difference.

Namely, though the size of the picture element electrode 60 is unchanged, the width of the aperture region in the vertical direction Y (d3) is changed from 48 μm to 35 μm, the width of the invalid region in the vertical direction Y (d4) is changed from 18 μm to 31 μm, the width of the scanning signal line (d10) is changed from 5 μm to 8 μm, and the gap between adjacent picture element electrodes 60 (d22) is changed from 7 μm to 19 μm.

(Comparison Object 2)

In contrast, as compared to the liquid crystal display device 10 of the present embodiment (see FIG. 1), the liquid crystal display device 10 of the comparison object 2 (see FIG. 14) is different in that there is no storage capacitor line 36 provided, but similar in that a picture element electrode 60 and a scanning signal line 32 overlap with each other in plan view.

Namely, the picture element electrode 60 overlaps the scanning signal line 32 and further extends beyond the scanning signal line 32 by a width of 2 μm (d20) (see FIG. 14).

Other members of the liquid crystal display device 10 of the comparison object 2 are arranged substantially similarly to those of the liquid crystal display device 10 of the comparison object 1 (see FIG. 12). In view of this, the following description discusses a main point of difference.

Namely, though the size of the picture element electrode 60 is unchanged, the width of the aperture region in the vertical direction Y (d3) is changed to 43 μm, the width of the invalid region in the vertical direction Y (d4) is changed to 23 µm, and the gap between adjacent picture element electrodes 60 (d22) is changed to 7 µm.

(Comparison of the Electrical Properties)

The following description discusses the electrical property of the liquid crystal display device 10 of the present embodiment, specifically, the parasitic capacitance (Cgd) generated between the picture element electrode 60 and the scanning signal line 32 and the storage capacitance, with reference to FIGS. 2, 13, and 15.

Note that solid lines V illustrated in FIGS. 2, 13, and 15 show equipotential lines.

Note also that parasitic capacitances and storage capacitances which are described below were found by the simulation.

(Simulation Conditions)

The simulation used for finding the electrical property is described here.

First, 2din-DIMOS (product name) of Autronic Melchers was used for the simulation.

Note that the following are conditions for the simulation.

Namely, relative permittivities were set to: 6.9 for the gate insulating film, 6.9 for the protecting film, 5.5 for the glass substrates (the first and second substrates), and 7.0 for the liquid crystal layer.

Note that film thicknesses were set to: 0.4 µm for the gate insulating film, 0.3 µm for the protecting film, 0.35 µm for the scanning signal line, and 4.5 µm for the liquid crystal layer.

Note also that electric potentials were set to: −10V for the scanning signal line, ±0V for the counter electrode, +5V for the driving picture element electrode, and −5V for the adjacent picture element electrode.

(Parasitic Capacitance (Cgd))

First, the following description discusses the parasitic capacitance (Cgd).

According to the result of the simulation, the parasitic capacitance (Cgd) for the liquid crystal display device of the comparison object 1 (see FIGS. 12 and 13) was found to be 0.0045 pF based on the equation of $Cgd=24.0\times10^{-12}$ [F/M]× 187 [µm], and the parasitic capacitance (Cgd) for the liquid crystal display device of the comparison object 2 (see FIGS. 14 and 15) was found to be 0.0022 pF based on the equation of $Cgd=11.9\times10^{-12}$ [F/m]×187 [µm].

In contrast, the parasitic capacitance (Cgd) for the liquid crystal display device 10 of the present embodiment (see FIGS. 1 and 2) was found to be 0.0006 pF based on the equation of $Cgd=3.3\times10^{-12}$ [F/M]×187 [µm]. This shows that the parasitic capacitance (Cgd) for the liquid crystal display device 10 of the present embodiment was reduced to approximately 13% of that for the comparison object 1 and to approximately 30% of that for the comparison object 2.

(Shielding by Adjacent Picture Element Electrode)

As for the parasitic capacitance generated between the driving picture element electrode 64 and the driving scanning signal line 33, according to the comparison object 1, there is no conductor interfering between a driving picture element electrode 64 and a driving scanning signal line 33. In contrast, according to the comparison object 2, an adjacent picture element electrode 66 interferes between a driving picture element 64 and a driving scanning signal line 33, similarly to the case of the present embodiment.

Namely, according to the comparison object 2 and the present embodiment, the adjacent picture element electrode 66 overlaps the driving scanning signal line 33 in plan view. This causes the adjacent picture element electrode 66 to interfere between the driving picture element electrode 64 and the driving scanning signal line 33. Then, a shielding effect of the adjacent picture element electrode 66 seems to reduce the parasitic capacitance (Cgd) generated between the driving picture element electrode 64 and the driving scanning signal line 33.

The equipotential lines V between the driving picture element electrode 64 and the driving scanning signal line 33 shows the shielding effect brought by this adjacent picture element electrode 66 (see FIGS. 2, 13, and 15). Namely, the equipotential lines V are less dense in the comparison object 2 (see FIG. 15) and the present embodiment (see FIG. 2) than in the comparison object 1 (see FIG. 13). This shows a shielding effect was achieved in the comparison object 2 and the present embodiment.

(The Storage Capacitor Line)

The following description discusses an influence of the storage capacitor line 36 on the parasitic capacitance (Cgd).

A point of difference between the comparison object 2 (see FIG. 15) and the present embodiment (see FIG. 2) is whether or not the storage capacitor 36 is provided. Specifically, according to the present embodiment, the storage capacitor line 36 is provided, in the vicinity of the scanning signal line 32 (driving scanning signal line 33), below the picture element electrode 60 (the driving picture element electrode 64) so as to overlap the picture element electrode 60 (driving picture element electrode 64).

This causes the storage capacitor line 36 to bring about the shielding effect, from the driving picture element electrode 64 in a downward direction, that is, toward the first substrate 22, to the parasitic capacitance (Cgd) generated between the driving picture element electrode 64 and the driving scanning signal line 33.

The equipotential lines V also show this. Namely, according to a comparison between FIGS. 15 and 2 of the equipotential lines V between the driving picture element electrode 64 and the driving scanning signal line 33, the equipotential lines V of the present embodiment (see FIG. 2) at least curve toward the storage capacitor line 36 and are therefore fewer than those of the comparison object 2 (see FIG. 15). This shows a greater shielding effect was achieved in the present embodiment.

As described earlier, according to the liquid crystal display device 10 of the present embodiment, the picture element electrode 60 overlaps the scanning signal line 32 and the storage capacitor line 36 is juxtaposed to the scanning signal line 32, below the picture element electrode 60. This allows a reduction in parasitic capacitance (Cgd).

(Storage Capacitance)

The following description discusses the storage capacitance.

First, according to the liquid crystal display devices 10 of the comparison object 1 and the comparison object 2, an auxiliary capacitance is generated only at a single point of each of the picture elements 14. Namely, a storage capacitance (Cgo) is generated in a part where the picture element electrode 60 and the scanning signal line 32 overlap with each other or are in proximity to each other.

The following description discusses the result of the simulation carried out under the conditions described above with respect to a value of the storage capacitance (Cgo).

Namely, the storage capacitance (Cgo) for the liquid crystal display device of the comparison object 1 (see FIGS. 12 and 13) was found to be 0.0134 pF based on the equation of $Cgo=0.794\times10^{-10}$ [F/m]×169 [µm], and the storage capacitance (Cgo) for the liquid crystal display device of the comparison object 2 (see FIGS. 14 and 15) was found to be 0.1477 pF based on the equation of $Cgo=8.739\times10^{-10}$ [F/m]×169 [µm].

In contrast, according to the liquid crystal display device 10 of the present embodiment (see FIGS. 1 and 2), the auxiliary capacitances are generated at two points of each of the picture elements 14.

Namely, the storage capacitance (Cgo) is generated between the picture element electrode 60 and the scanning signal line 32 similarly to the cases of the comparison object 1 and the comparison object 2. According to the present embodiment, the storage capacitor line 36 is provided. The storage capacitance (Ccs) is therefore generated between the picture element electrode 60 and the storage capacitor line 36, in addition to the storage capacitance (Cgo).

The following description discusses the result of the simulation carried out under the conditions described above with respect to values of the storage capacitance (Cgo) and the storage capacitance (Ccs).

Namely, as for the liquid crystal display device of the present embodiment (see FIGS. 1 and 2), the storage capacitance (Cgo) was found to be 0.1025 pF based on the equation of $Cgo=0.6066\times10^{-10}$ [F/m]×169 [μm] and the storage capacitance (Ccs) was found to be 0.779 pF based on the equation of $Ccs=4.165\times10^{-10}$ [F/m]×187 [μm].

Then, a sum of the storage capacitance (Cgo) and the storage capacitance (Ccs) is found to be 0.1804 pF. This shows that it was possible to secure the storage capacitance equivalent to or greater than that generated not only in the comparison object 1 but also in the comparison object 2.

In view of the above descriptions, according to the liquid crystal display device 10 of the present embodiment, it is possible to reduce the parasitic capacitance (Cgd) by (i) expanding the width of the aperture region in the vertical direction (d4) from 35 μm through 43 μm to 48 μm so as to secure an aperture ratio at not less than an equal level and (ii) securing the storage capacitance.

[Second Embodiment]

Figure 3:
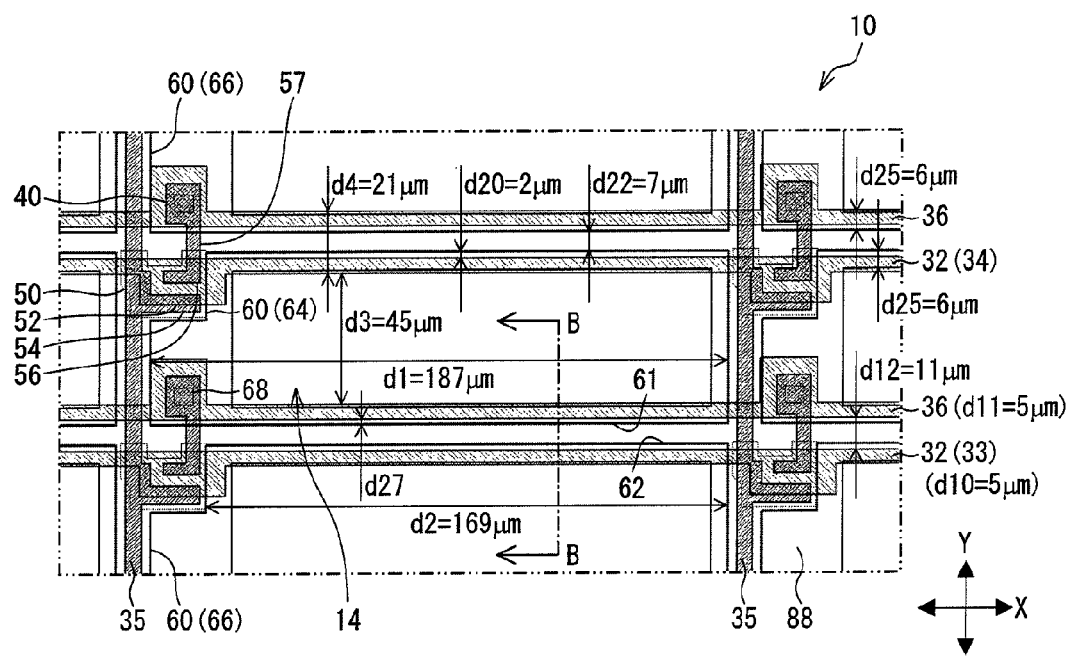
FIG. 3 is a drawing illustrating a schematic arrangement of picture elements of a liquid crystal display device in accordance with another embodiment of the present invention.
Figure 4:
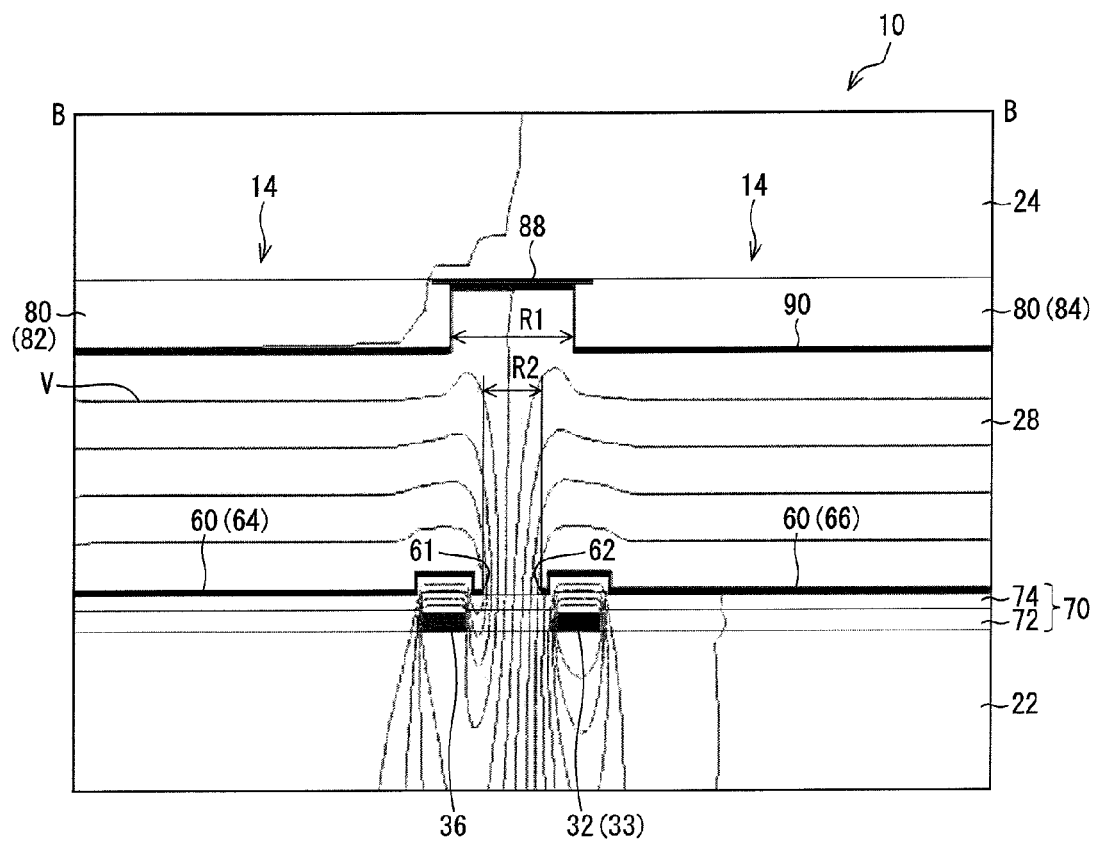
FIG. 4 is a cross-sectional view taken from the line B-B of FIG. 3.

The following description discusses a second embodiment of the present invention with reference to FIGS. 3 through 4. Note that an arrangement which is not described in the present embodiment is identical to the arrangement described in the First Embodiment. Note also that, for convenience, members having functions identical to those of the respective members illustrated in the drawings of the First Embodiment are given respective identical reference numerals, and a description of those members is omitted herein.

A liquid crystal display device 10 of the present embodiment is different from the liquid crystal display device 10 of the First Embodiment in that an end side 61 of a picture element electrode 60 which end side faces a scanning signal line 32 extends beyond a storage capacitor line 36.

Namely, according to the liquid crystal display device 10 of the First Embodiment, the end side 61 of the picture element electrode 60 which end side faces the scanning signal line 32 remains above the storage capacitor line 36 though the picture element electrode 60 overlaps the storage capacitor line 36 in plan view (see FIG. 2). In other words, the picture element electrode 60 merely overlaps but does not extend beyond the storage capacitor line 36.

In contrast, according to the liquid crystal display device of the present embodiment, the end side 61 of the picture element electrode 60 which end side faces the scanning signal line 32 extends beyond the storage capacitor line 36 by 2 μm (see d27 (a width by which the picture element electrode extends beyond the storage capacitor line) in FIG. 3). Note here that FIG. 3 is a drawing illustrating a schematic arrangement of picture elements 14.

Note that the following description discusses a point of difference from the First Embodiment, though other members of the liquid crystal display device 10 of the present embodiment are arranged similarly to those of the liquid crystal display device 10 of the First Embodiment. Namely, the width of the aperture region in the vertical direction Y (d3) is changed from 48 μm to 45 μm, the width of the invalid region in the vertical direction Y (d4) is changed from 18 μm to 21 μm, and the gap between the scanning signal line 32 and the storage capacitor line 36 (d12) is changed from 7 μm to 11 μm.

Note that the picture element electrode 60 overlaps the storage capacitor line 36 via an insulating film 70 including a gate insulating film 72 and a protecting film 74 similarly to the case of the First Embodiment (see FIG. 4, which is a cross-sectional view taken from the line B-B of FIG. 3). As described earlier, the end side 61 of the picture element electrode 60 which end side faces the scanning signal line 32 extends beyond the storage capacitor line 36 toward the scanning signal line 32 juxtaposed to the storage capacitor line 36. Note, however, that the picture element electrode 60 which extends beyond the storage capacitor line 36 overlaps no scanning signal line 32 that is adjacent to the storage capacitor line 36.

(Electrical Property)

The following description discusses an electrical property of the liquid crystal display device 10 of the present embodiment.

(Parasitic Capacitance)

First, a parasitic capacitance (Cgd) is described.

According to a result of a simulation carried out under the simulation conditions described in the First Embodiment, the parasitic capacitance (Cgd) for the liquid crystal display device 10 of the present embodiment (see FIGS. 3 and 4) was found to be 0.0013 pF based on the equation of $Cgd=7.1\times10^{-12}$ [F/m]×187 [μm]. Namely, it is possible to reduce the parasitic capacitance (Cgd) for the liquid crystal display device 10 of the present embodiment to approximately 60% of that (0.0022 pF) for the comparison object 2.

(Storage Capacitance)

The following description discusses a storage capacitance.

According to the liquid crystal display device 10 of the present embodiment, the storage capacitor line 36 is provided so as to overlap the picture element electrode 60. Therefore, the storage capacitance includes a storage capacitance (Cgo) and a storage capacitance (Ccs), similarly to the case of the First Embodiment.

Specifically, according to the simulation carried out under the conditions described above, the storage capacitance (Cgo) was found to be 0.1026 pF based on the equation of $Cgo=0.6076\times10^{-10}$ [F/m]×169 [μm] and the storage capacitance (Ccs) was found to be 0.1146 pF based on the equation of $Ccs=6.127\times10^{-10}$ [F/m]×187 [μm].

Then, a sum of the storage capacitance (Cgo) and the storage capacitance (Ccs) is found to be 0.2172 pF. This shows that it was possible to secure the storage capacitance equivalent to or greater than that generated not only in the comparison objects 1 and 2 but also in the First Embodiment.

As described above, according to the liquid crystal display device 10 of the present embodiment, it is possible to reduce the parasitic capacitance (Cgd) as described earlier by (i) expanding the width of the aperture region so as to cause an increase in aperture ratio and (ii) securing such a large storage capacitance as described above.

(Yield)

Note that the liquid crystal display device 10 of the present embodiment has a feature of allowing an increase in production yield thereof.

Namely, according to the liquid crystal display device 10 of the present embodiment, it is possible to widen the gap (d12) between the scanning signal line 32 and the storage capacitor line 36 which are juxtaposed (First Embodiment: 7 μm, present embodiment: 11 μm).

This allows an increase in yield with respect to a leak defect.

[Third Embodiment]

Figure 5:
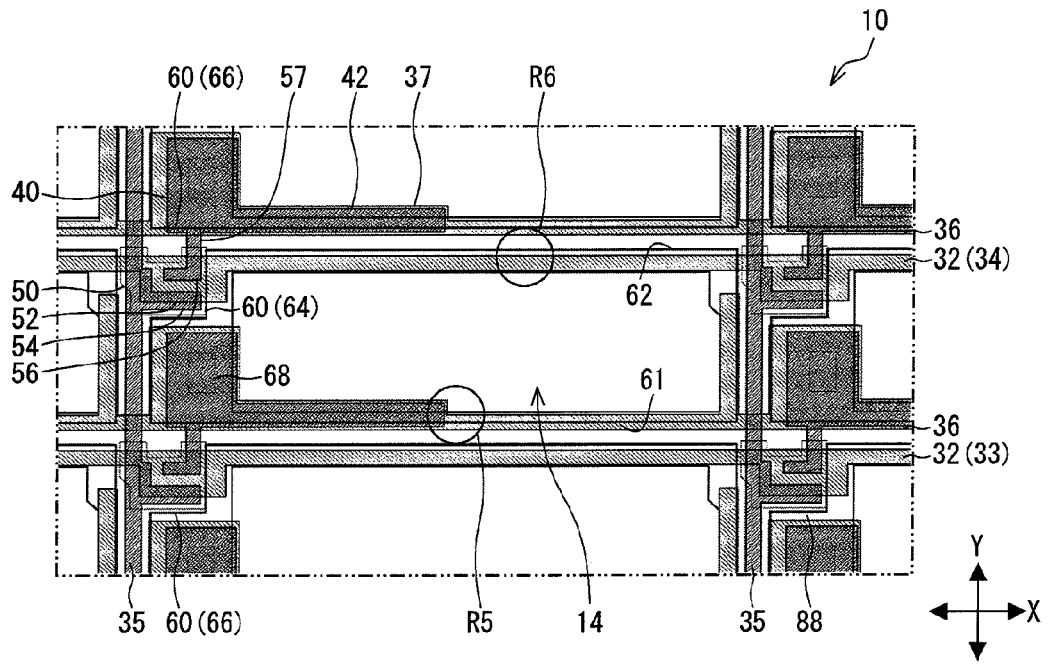
FIG. 5 is a drawing illustrating a schematic arrangement of picture elements of a liquid crystal display device in accordance with a further embodiment of the present invention.
Figure 6:
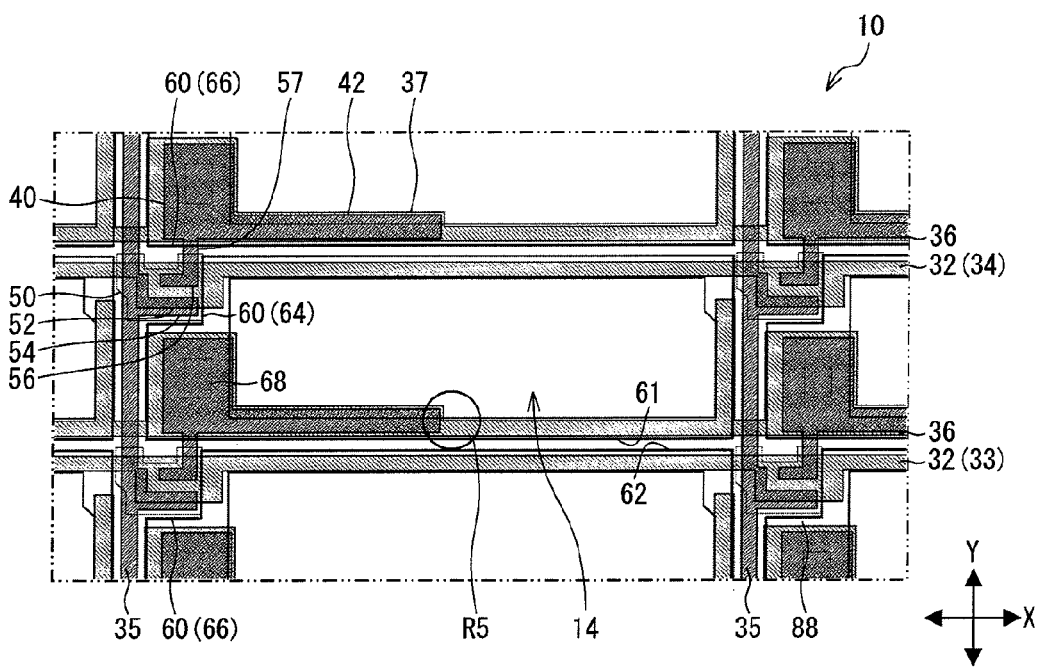
FIG. 6 is a drawing illustrating a schematic arrangement of picture elements of a liquid crystal display device in accordance with a further embodiment of the present invention.
Figure 7:
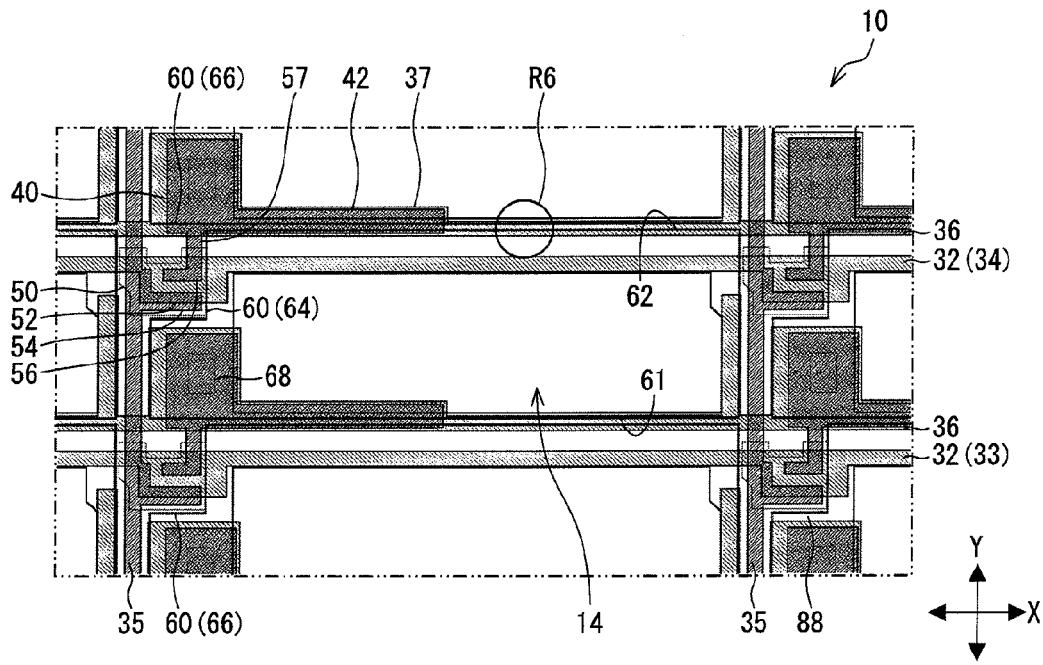
FIG. 7 is a drawing illustrating a schematic arrangement of picture elements of a liquid crystal display device in accordance with a further embodiment of the present invention.

The following description discusses a third embodiment of the present invention with reference to FIGS. 5 through 7. Note that an arrangement which is not described in the present embodiment is identical to the arrangements described in the respective Embodiments. Note also that, for convenience, members having functions identical to those of the respective members illustrated in the drawings of the respective Embodiments are given respective identical reference numerals, and a description of those members is omitted herein.

(Storage Capacitor Counter Electrode Extending Section)

A liquid crystal display device 10 of the present embodiment is different from the liquid crystal display device 10 of the First Embodiment in that a storage capacitor counter electrode 40 is extended in an extending direction of a storage capacitor line 36. Namely, according to the liquid crystal display device 10 of the present embodiment, the storage capacitor counter electrode 40 includes a storage capacitor counter electrode extending section 42 provided in a direction identical to the extending direction of the storage capacitor line 36 which the storage capacitor counter electrode 40 overlaps in plan view.

(Storage Capacitor Line Widened Section)

Note that according to the liquid crystal display device 10 of the present embodiment, the storage capacitor line 36 includes a storage capacitor line widened section 37 where the storage capacitor line 36 has a larger width than in the other region thereof.

The storage capacitor line widened section 37 is provided so as to correspond to the storage capacitor counter electrode extending section 42. Specifically, the storage capacitor line widened section 37 is provided so as to overlap the storage capacitor counter electrode extending section 42 in plan view, more specifically so that the storage capacitor counter electrode extending section 42 does not protrude from the storage capacitor line widened section 37 in plan view.

According to the liquid crystal display device 10 of the present embodiment, the arrangement described above causes a part where the storage capacitor counter electrode 40 and the storage capacitor line 36 overlap with each other to have a large area. This allows an increase in storage capacitance (Ccs).

Note that a positional relationship between a picture element electrode 60, a scanning signal line 32, and the storage capacitor line 36 is not limited to that illustrated in FIG. 5 and can be variously arranged.

For example, according to the arrangement illustrated in FIG. 5, an end side 61 of the picture element electrode 60 which end side faces the scanning signal line 32 is located so as not to extend beyond the storage capacitor line 36 (see a region R5). Alternatively, for example, the end side 61 can be located so as to extend beyond the storage capacitor line 36 (see FIG. 6). Namely, the picture element electrode 60 can be arranged to extend beyond the storage capacitor line 36. Note that the end side 61 does not overlap a driving scanning signal line 33 which is adjacent to the storage capacitor line 36.

Further, for example, according to the arrangement illustrated in FIG. 5, an end side 62 of the picture element electrode 60 which end side faces the storage capacitor line 36 extends beyond an adjacent scanning signal line 34 but does not overlap the storage capacitor line 36 which is juxtaposed to the adjacent scanning signal line 34 (see a region R6). In contrast, for example, the end side 62 may be arranged to extend beyond the adjacent scanning signal line 34 and further to overlap the storage capacitor line 36 which is juxtaposed to the adjacent scanning signal line 34 (see FIG. 7). According to the arrangement, it is possible to cause a further increase in storage capacitance.

[Fourth Embodiment]

Figure 8:
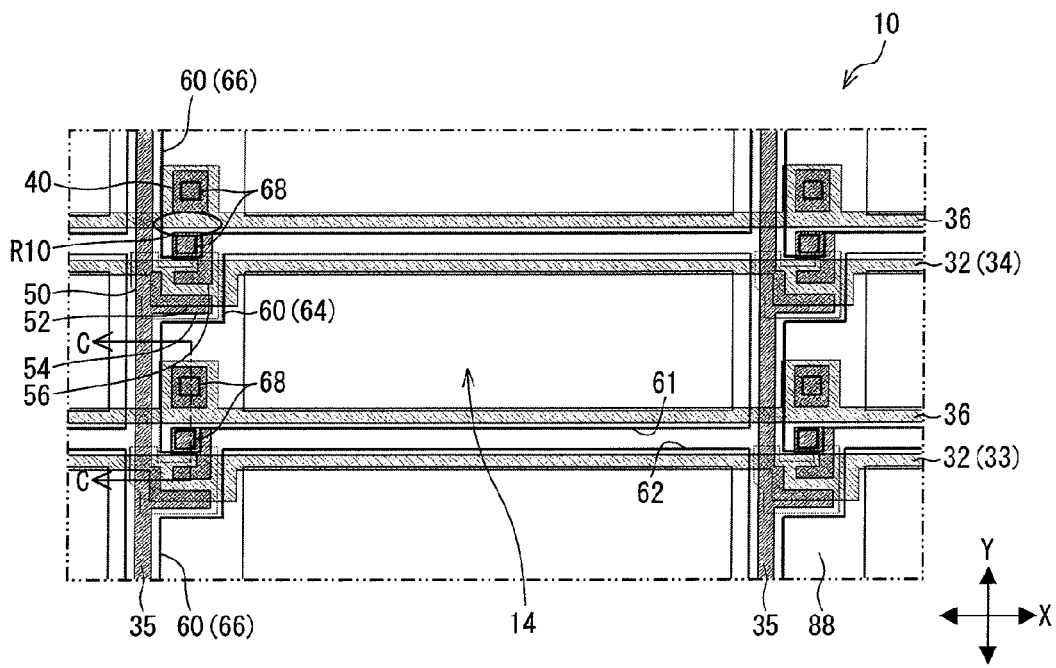
FIG. 8 is a drawing illustrating a schematic arrangement of picture elements of a liquid crystal display device in accordance with a further embodiment of the present invention.
Figure 9:
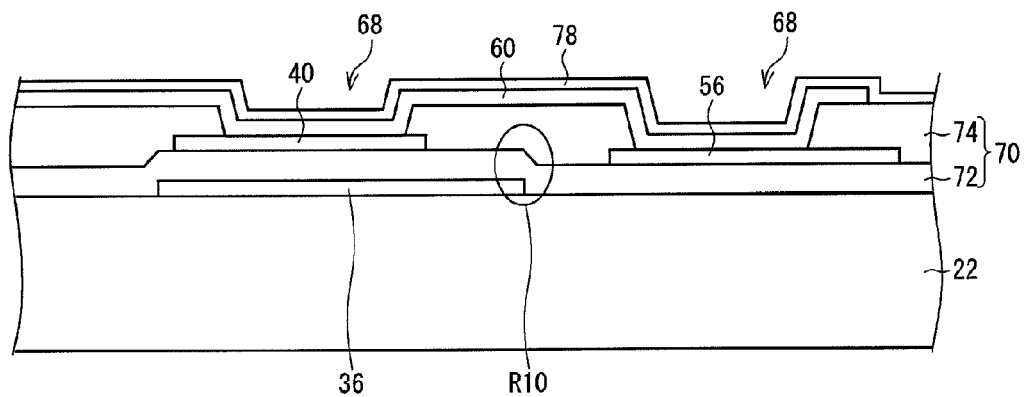
FIG. 9 is a cross-sectional view taken from the line C-C of FIG. 8.

The following description discusses a third embodiment of the present invention with reference to FIGS. 8 through 9. Note that an arrangement which is not described in the present embodiment is identical to the arrangements described in the respective Embodiments. Note also that, for convenience, members having functions identical to those of the respective members illustrated in the drawings of the respective Embodiments are given respective identical reference numerals, and a description of those members is omitted herein.

The description of the First Embodiment discusses the arrangement in which the storage capacitor counter electrode 40 is formed as the extending part of the drain electrode 56. In contrast, according to a liquid crystal display device 10 of the present embodiment, a storage capacitor counter electrode 40 is connected to a drain electrode 56 via a picture element electrode 60. The following description is given with reference to FIG. 8 and FIG. 9. FIG. 8 is a drawing illustrating a schematic arrangement of picture elements 14 of the liquid crystal display device 10, and FIG. 9 is a cross-sectional view taken from the line C-C of FIG. 8.

Namely, the storage capacitor counter electrode 40 is electrically connected to the picture element electrode 60 via a contact hole 68. Then, the picture element electrode 60 is connected to the drain electrode 56 of a switching element 50 also via the contact hole 68. This causes the storage capacitor counter electrode 40 to be connected to the drain electrode 56 via the picture element electrode 60. The storage capacitor counter electrode 40 is therefore equivalent in electric potential to the drain electrode 56. Note that a reference numeral 78 in FIG. 9 refers to an alignment film.

According to the arrangement in which the drain electrode 56 and the storage capacitor counter electrode 40 are electrically connected so as to be equivalent in electric potential, the drain electrode 56 intersects no storage capacitor line 36.

Namely, according to the liquid crystal display device 10 of the First Embodiment, the drain electrode connection section 57 via which the storage capacitor counter electrode 40 is connected to the drain electrode 56 intersects an edge part of the storage capacitor line 36(see a region R10 in FIG. 1). In other words, the storage capacitor counter electrode 40 (the extending part of the drain electrode 56) reaches the edge part of the storage capacitor line 36.

In contrast, according to the liquid crystal display device 10 of the present embodiment, the storage capacitor counter electrode 40 is connected to the drain electrode 56 via the picture element electrode 60. Accordingly, unlike the case of the First Embodiment, there is no drain electrode connection section 57 provided. Consequently, a case will not occur in which a drain electrode connection section 57 intersects the storage capacitor line 36.

This can prevent (i) a leak defect between the storage capacitor line 36 and the drain electrode 56 and/or (ii) disconnection in the drain electrode connection section 57.

Note that a change in storage capacitance is less likely to occur even in a case where the storage capacitor counter electrode 40 is misaligned with respect to the storage capacitor line 36. As for this point, according to the arrangement in which the storage capacitor counter electrode 40 is connected to the drain electrode 56 via the drain electrode connection section 57 (see FIG. 1), such a positional misalignment as described above causes increase and decrease in area of a region where the storage capacitance is formed, and the change in storage capacitance due to the positional misalignment is therefore highly likely to occur.

Note also that according to the arrangement, it is possible to cause a separation into blocks to be less likely to occur when a so-called step-and-repeat exposure is carried out.

(Color Filter)

The following description discusses a positional relationship in a state where the first substrate 22 and the second substrate 24 are assembled with each other, with reference to drawings in which an arrangement of the color filters 80 is mainly illustrated.

Figure 10:
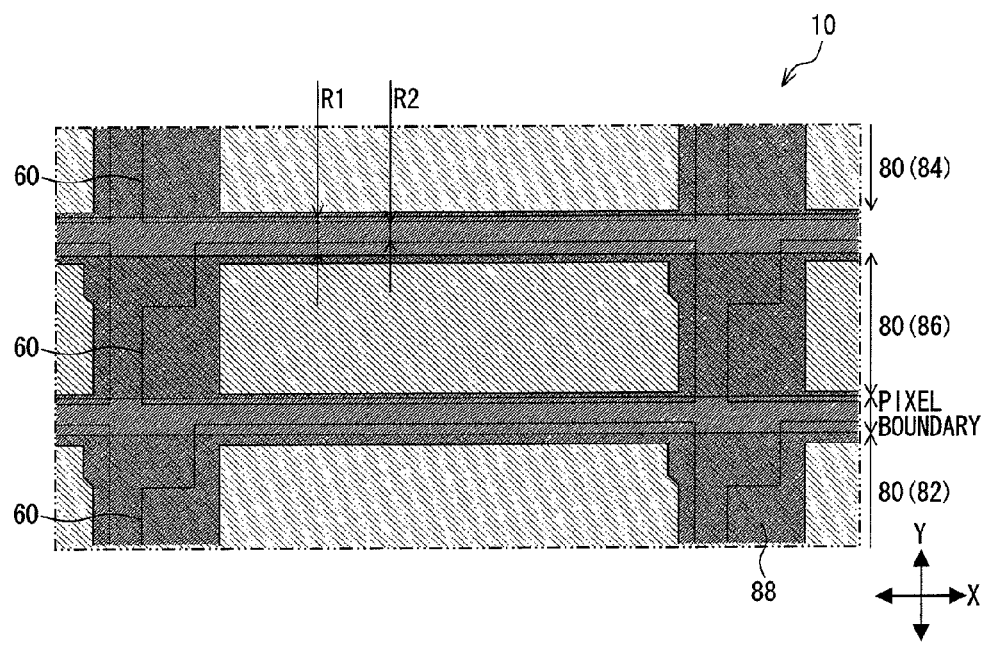
FIG. 10 is a drawing illustrating an arrangement of color filters in accordance with an embodiment of the present invention.
Figure 11:
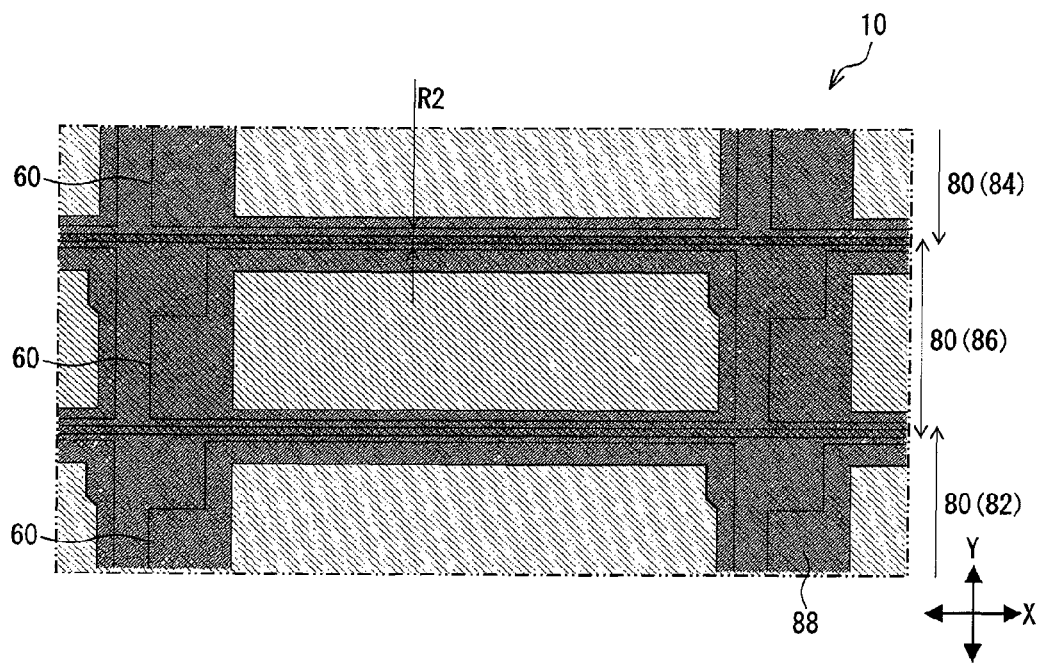
FIG. 11 is a drawing illustrating an arrangement of color filters in accordance with another embodiment of the present invention.

FIGS. 10 and 11 illustrate an arrangement of at least the color filters 80 and show at least where the picture element electrodes 60 are provided in the state where the first substrate 22 and the second substrate 24 are assembled with each other.

On the second substrate 24 of each of the embodiments of the present invention, the color filters 80 (the red color filter 82, the green color filter 84, and the blue color filter 86) are provided so as to correspond to the respective picture element electrodes 60 provided on the first substrate 22.

The color filters 80 have different colors for each of the color filters 80 which correspond to the respective picture element electrodes 60 which are adjacent in the vertical direction Y, which is the direction in which the video signal lines extend.

Further, the color filters 80 of different colors are provided so as not to make contact with each other. This produces a constant gap in the boundary region R1 between the color filters 80 of different colors.

The black matrix 88 is provided so as to cover the boundary region R1 in the boundary region R1 between the color filters 80.

(Black Matrix and the Storage Capacitor Line)

As described earlier with reference to FIGS. 1 and 2, according to the liquid crystal display device 10 of the First Embodiment, the storage capacitor line 36 provided on the first substrate 22 at least partially overlaps the black matrix 88 in plan view.

(Boundary Region between the Color Filters and Boundary Region between the Picture Element Electrodes)

For example, according to the liquid crystal display device 10 of the First Embodiment, the boundary region R1 between the color filters 80 and the boundary region R2 between the picture element electrodes 60 which are adjacent in the vertical direction Y, which is the direction in which the video signal lines 35 extend, at least partially overlap with each other in plan view.

(Overlap Between the Color Filters)

Note that an arrangement of the color filters 80 is not limited to the arrangement illustrated in FIG. 10 and the color filters 80 can be differently arranged.

Specifically, for example, it is possible to arrange adjacent ones of the color filters 80 of different colors to overlap with each other in the boundary region R1 between the adjacent ones of the color filters 80 of different colors (see FIG. 11).

Note here that according to an arrangement in which the adjacent ones of the color filters 80 are not in contact with each other in the boundary region between the adjacent ones of the color filters 80, the different colors are spaced from each other along a color boundary between the adjacent ones of the color filters. This can prevent such a case that the adjacent ones of the color filters of different colors rise toward the first substrate in a part where the different colors overlap with each other. This can also prevent a leak between the respective picture element electrodes and the common electrode even in a case where (a) an electrically conductive foreign matter is included in a liquid crystal layer or (b) a display surface of a display device is pressed with a finger.

Note that the liquid crystal layer has a larger thickness along the color boundary between the adjacent ones of the color filters of different colors than in the other part of the liquid crystal layer by a thickness of the adjacent ones of the color filters. According to the arrangement, (i) the boundary region where the liquid crystal layer has the larger thickness and (ii) a boundary between corresponding adjacent picture element electrodes, that is, a region where no picture element electrode is provided at least partially overlap with each other in plan view. This can prevent a decrease in liquid crystal capacitance. This can also reduce an influence of the parasitic capacitance (Cgd) on a display quality because it is easy to secure a large liquid crystal capacitance even in a case where the first substrate and the second substrate are positionally misaligned when assembled.

Note that it is possible to cause the common electrode 90 to be in contact with the black matrix 88 described above in a place where the adjacent ones of the color filters are spaced. Particularly in a case where a surface of the black matrix on which surface the black matrix is in contact with the common electrode 90 is a metal layer, it is possible to cause the common electrode 90 to have a lower resistance. This can reduce a signal delay in the common electrode 90. Namely, it is possible to more securely apply a desired voltage to liquid crystal.

In contrast, according to the arrangement in which one of the adjacent ones of the color filters 80 overlap the other of the adjacent ones of the color filters 80 in the boundary region between the adjacent ones of the color filters 80 of different colors, the color filters of different colors overlap. Therefore, no region where the liquid crystal layer has a larger thickness than in the other region thereof is formed. This can more securely prevent a decrease in liquid crystal capacitance. Note that though rising toward the first substrate, the adjacent ones of the color filters at least partially overlap with each other in plan view, along a color boundary of the adjacent ones of the color filters, a boundary between corresponding adjacent picture element electrodes, that is, a region where no picture element electrode is provided. This can prevent a leak between the corresponding adjacent picture element electrodes and the common electrode even in a case where (a) an electrically conductive foreign matter is included in a liquid crystal layer or (b) a display surface of a liquid crystal display device is pressed with a finger.

The arrangement is preferably applied to a device in which information can be entered from outside by touching a display surface of a display device such as a device including at least a touch panel and a light sensor. Note that the touch panel, the light sensor and the like can be provided not only on the display surface but also on a backside or a first substrate of the display device.

Note that an arrangement of the liquid crystal display device 10 of the present invention is not limited to the above descriptions.

For example, the above descriptions discuss the case of the arrangement of the color filters 80 of three colors. The number of colors of the color filters 80 is not limited to three and can be four or more, for example.

For example, in a case where a dot is squared, as the number of colors increases, picture elements become transversely lengthened and the parasitic capacitance (Cgd) is therefore enlarged with respect to the total of the parasitic capacitances (Cpix). Accordingly, in such an arrangement, an effect of reducing the parasitic capacitance (Cgd) in accordance with the present invention is more remarkable.

Note that in a case where the color filters 80 as described above are transversely striped, it is possible to cause a memory to be less consumed, for example in data processing of a digital image.

Note also that in a case where the color filters 80 which are adjacent in a direction in which the scanning signal lines 32 extend have different colors, it is possible to realize a smoother display in displaying a natural image.

Note also that in a case where the picture element electrodes 60 are patterned by use of a step-and-repeat exposure device as described earlier, it is possible to prevent a so-called separation into blocks according to the present invention.

Note also that an arrangement of the picture element electrodes is not limited to the arrangement in which the picture element electrodes are made solely of a transparent electrode. For example, it is possible to form a display device which is both reflective and transparent and in which a reflective film is provided on a part of the transparent electrode.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is suitably applicable particularly to a comparatively small-sized liquid crystal display device such as a mobile phone, a PDA, a personal navigation system, or a portable game machine which is required to achieve a low power consumption and a high display quality.

The invention claimed is:

1. A liquid crystal display device including:
a first substrate;
a second substrate;
a liquid crystal material sealed between the first substrate and the second substrate;
a plurality of scanning signal lines on the first substrate;
a plurality of video signal lines on the first substrate which intersect the respective plurality of scanning signal lines;
a plurality of switching elements on the first substrate which are electrically connected to the respective plurality of scanning signal lines and the respective plurality of video signal lines; and
a plurality of picture element electrodes on the first substrate which are provided in a matrix pattern and electrically connected to the respective switching elements,
the respective picture element electrodes having a longer length in a direction along the scanning signal lines than in a direction along the video signal lines,
said liquid crystal display device comprising:
storage capacitor lines; and
storage capacitances,
the storage capacitor lines being provided on the first substrate along the scanning signal lines such that each of the scanning signal lines is arranged between two storage capacitor lines,
the storage capacitances being formed in respective overlap regions in which the storage capacitor lines overlap the respective picture element electrodes via an insulating film in plan view,
in a part of the respective overlap regions, the storage capacitor lines overlapping, in plan view, storage capacitor counter electrodes which are provided in a layer above the respective storage capacitor lines via the insulating film,
the respective storage capacitor counter electrodes being electrically connected to the respective plurality of picture element electrodes, and being electrically connected to respective drain electrodes of the switching elements via respective drain electrode connection sections,
the respective storage capacitor counter electrodes having a larger width than a width of the respective drain electrode connection sections in a direction along the scanning signal lines, and being formed in such a manner that their end sides other than an end side connected to the respective drain electrodes are located, in plan view, inside of a region of the corresponding storage capacitor lines so as not to overlap end sides of the corresponding storage capacitor lines defining the region,
the scanning signal lines and the storage capacitor lines overlapping, in plan view, black matrices provided in a layer above the scanning signal lines and the storage capacitor lines,
a gap being provided between a scanning signal line of the plurality of scanning signal lines and one of the two storage capacitor lines which is closer to the scanning signal line than the other of the two storage capacitor lines, and the gap overlapping a corresponding one of the black matrices at least in plan view, wherein
a corresponding one of the picture element electrodes has a first end side facing the scanning signal line that forms the gap with the one of the two storage capacitor lines, and
the first end side of the corresponding one of the picture element electrodes overlaps, in plan view, the one of the two storage capacitor lines and the corresponding one of the black matrices in such a manner that the first end side does not extend beyond the one of the two storage capacitor lines toward the scanning signal line that forms the gap with the one of the two storage capacitor lines.

2. The liquid crystal display device as set forth in claim 1, wherein, for each of the picture element electrodes, a storage capacitor line corresponding to that picture element electrode is juxtaposed to that one of the plurality of scanning signal lines which is electrically connected to that picture element electrode via a corresponding switching element.

3. The liquid crystal display device as set forth in claim 1, wherein:
for each of the picture element electrodes, a storage capacitor line corresponding to that picture element electrode is juxtaposed to that one of the plurality of scanning signal lines which is electrically connected to that picture element electrode via a corresponding switching element; and
the storage capacitor line overlaps that picture element electrode via the insulating film in plan view in such a manner that the storage capacitor line overlaps the first end side.

4. The liquid crystal display device as set forth in claim 1, wherein each of the plurality picture of picture element electrodes overlaps, via the insulating film in plan view, such that one of the plurality of scanning signal lines is provided so as to drive a picture element electrode that is adjacent to that picture element electrode in the direction in which the plurality of video signal lines extend, and a second end side of that picture element electrode extends beyond this scanning signal line in plan view.

5. The liquid crystal display device as set forth in claim 1, wherein:
each of the plurality of picture element electrodes overlaps, via the insulating film in plan view, that one of the plurality of scanning signal lines which is provided so as to drive a picture element electrode which is adjacent to that picture element electrode in the direction in which the plurality of video signal lines extend, and an end side of that picture element electrode extends beyond this scanning signal line in plan view; and
the end side of that picture element electrode overlaps, in plan view, a corresponding storage capacitor line provided along this scanning signal line.

6. The liquid crystal display device as set forth in claim 1, wherein in plan view, the plurality of picture element electrodes are provided on a protecting film which is provided so as to cover the plurality of video signal lines.

7. The liquid crystal display device as set forth in claim 6, wherein:
storage capacitor counter electrodes are provided in a layer above the respective storage capacitor lines via the insulating film; and
the storage capacitor counter electrodes are made of a material of which drain electrodes of the respective switching elements are made.

8. The liquid crystal display device as set forth in claim 7, wherein the storage capacitor counter electrodes are extending parts of the respective drain electrodes of the respective switching elements.

9. The liquid crystal display device as set forth in claim 1, comprising:
on the second substrate, color filters which correspond to the respective picture element electrodes provided on the first substrate; wherein:
the color filters are different in color between adjacent ones in the direction in which the plurality of video signal lines extend, so that color filters which correspond to picture element electrodes adjacent to each other are different in color in the direction in which the plurality of video signal lines extend;
the black matrices are provided in a boundary region between the respective color filters of different colors; and
the storage capacitor lines at least partially overlap the respective black matrices in plan view.

10. The liquid crystal display device as set forth in claim 9, wherein (i) the boundary region between the respective color filters of different colors and (ii) a boundary region between the respective picture element electrodes which are adjacent in the direction in which the plurality of video signal lines extend at least partially overlap in plan view.

11. The liquid crystal display device as set forth in claim 9, comprising a common electrode above the color filters.

12. The liquid crystal display device as set forth in claim 9, wherein the color filters of different colors are not in contact with each other in the boundary region between the respective color filters of different colors.

13. The liquid crystal display device as set forth in claim 9, wherein adjacent ones of the color filters of different colors overlap with each other in a boundary region between the adjacent ones of the color filters of different colors.

14. The liquid crystal display device as set forth in claim 1, wherein each of the picture element electrodes overlaps, via the insulating film in plan view, that one of the plurality of scanning signal lines which is provided so as to drive a picture element electrode which is adjacent to that picture element electrode in a direction in which the plurality of video signal lines extend.

15. The liquid crystal display device as set forth in claim 14, wherein each of the plurality of picture element electrodes overlaps, via the insulating film in plan view, such that only one of the plurality of scanning signal lines is provided so as to drive a picture element electrode which is adjacent to that picture element electrode in the direction in which the plurality of video signal lines extend.

16. The liquid crystal display device as set forth in claim 1, wherein the one of the two storage capacitor lines has a first part which does not overlap the corresponding one of the picture element electrodes and overlaps the corresponding one of the black matrices in plan view.

17. The liquid crystal display device as set forth in claim 1, wherein the corresponding one of the picture element electrodes and one of the plurality of scanning signal lines which is provided so as to drive the corresponding one of the picture element electrodes do not overlap in plan view.

* * * * *